(12) United States Patent
Bracey

(10) Patent No.: US 11,231,236 B2
(45) Date of Patent: Jan. 25, 2022

(54) ROTARY REGENERATOR

(71) Applicant: Intelligent Power Generation Limited, Greater London (GB)

(72) Inventor: Tristram Bracey, Sussex (GB)

(73) Assignee: Intelligent Power Generation Limited, Greater London (GB)

( * ) Notice: Subject to any disclaimer, the term of this patent is extended or adjusted under 35 U.S.C. 154(b) by 0 days.

(21) Appl. No.: 17/057,445

(22) PCT Filed: May 28, 2019

(86) PCT No.: PCT/GB2019/051456
§ 371 (c)(1),
(2) Date: Nov. 20, 2020

(87) PCT Pub. No.: WO2019/224563
PCT Pub. Date: Nov. 28, 2019

(65) Prior Publication Data
US 2021/0199388 A1    Jul. 1, 2021

(30) Foreign Application Priority Data
May 25, 2018    (GB) .................................... 1808662

(51) Int. Cl.
*F28D 19/04*    (2006.01)
*F02C 7/105*    (2006.01)
*F01K 23/10*    (2006.01)

(52) U.S. Cl.
CPC ............ *F28D 19/045* (2013.01); *F02C 7/105* (2013.01); *F28D 19/041* (2013.01); *F01K 23/10* (2013.01)

(58) Field of Classification Search
CPC ...... F28D 19/045; F28D 19/041; F28D 19/04; F02C 7/105; F01K 23/10
USPC ........................................................ 165/8, 10
See application file for complete search history.

(56) References Cited

U.S. PATENT DOCUMENTS

| | | | |
|---|---|---|---|
| 3,138,198 A | | 6/1964 | Theoclitus |
| 3,228,457 A | * | 1/1966 | Schöll ................... F28D 19/047 165/7 |
| 3,276,515 A | * | 10/1966 | Whitfield .............. F28D 19/042 165/10 |
| 3,308,876 A | * | 3/1967 | Gram, Jr. ................ F28D 19/04 165/10 |
| 3,391,727 A | | 7/1968 | Topouzian |
| 4,252,181 A | | 2/1981 | Kirchmeier |
| 4,491,171 A | * | 1/1985 | Zenkner .................. F28D 19/02 165/10 |
| 4,513,807 A | * | 4/1985 | Rose .................... B21D 53/027 165/10 |

(Continued)

FOREIGN PATENT DOCUMENTS

| | | |
|---|---|---|
| GB | 708369 A | 5/1954 |
| GB | 1444203 A | 7/1976 |
| GB | 1511045 A | 5/1978 |

OTHER PUBLICATIONS

International Patent Application No. PCT/GB2019/051456, Search Report and Written Opinion, dated Aug. 12, 2019.

*Primary Examiner* — Jon T. Schermerhorn, Jr.
(74) *Attorney, Agent, or Firm* — Kilpatrick Townsend & Stockton LLP

(57) ABSTRACT

A heat exchanger for heat exchange between fluid streams incorporates rotary features to control the passage of the streams.

17 Claims, 20 Drawing Sheets

(56) References Cited

U.S. PATENT DOCUMENTS

| | | | |
|---|---|---|---|
| 4,699,206 A * | 10/1987 | Kirchmeier | F28D 19/045 |
| | | | 165/10 |
| 5,643,538 A * | 7/1997 | Morlec | F23G 7/068 |
| | | | 422/173 |
| 5,873,250 A | 2/1999 | Lewis et al. | |
| 5,950,707 A | 9/1999 | Kozacka et al. | |
| 6,170,251 B1 | 1/2001 | Skowronski et al. | |
| 6,622,470 B2 | 9/2003 | Viteri et al. | |
| 9,279,364 B2 | 3/2016 | Hamrin et al. | |
| 2009/0101302 A1 * | 4/2009 | Tupper | F28D 19/045 |
| | | | 165/7 |
| 2012/0324903 A1 | 12/2012 | Dewis et al. | |
| 2014/0216687 A1 | 8/2014 | Kaufman | |

* cited by examiner

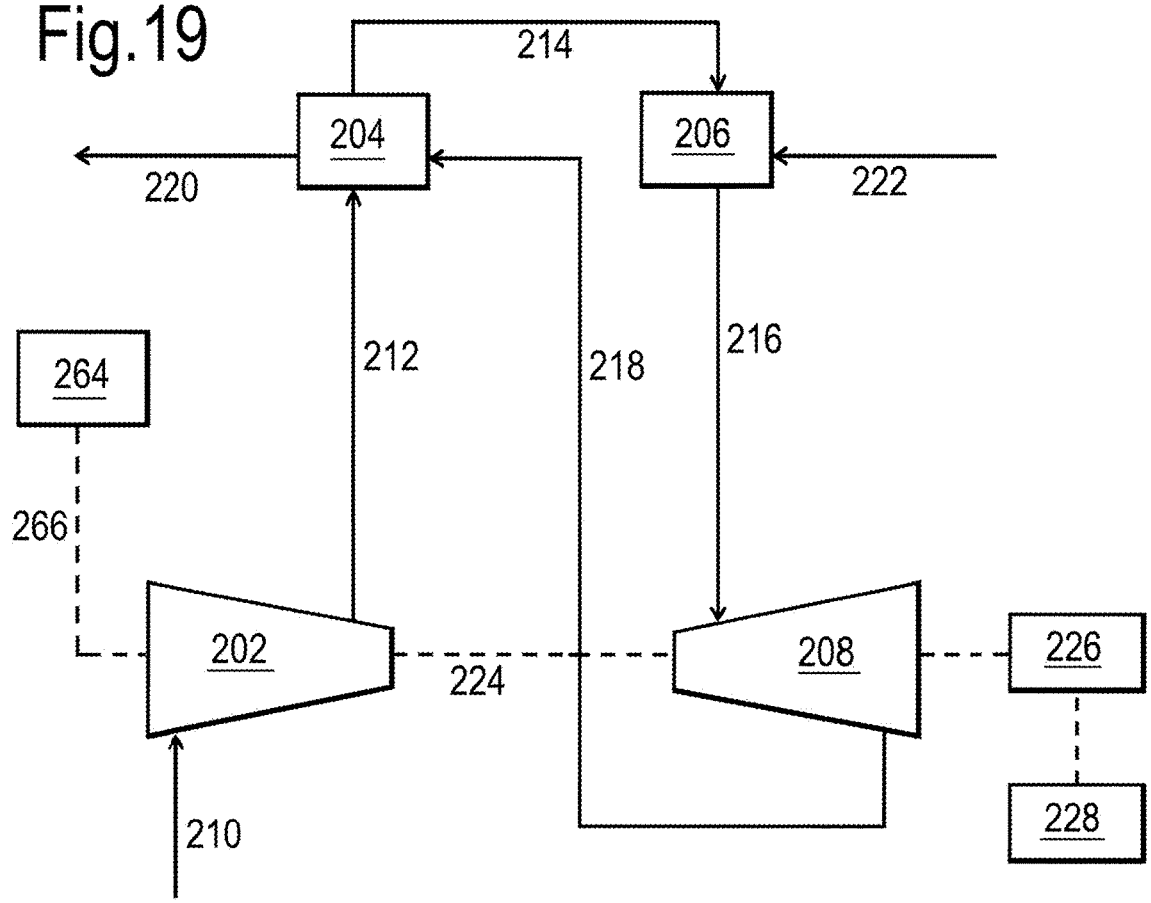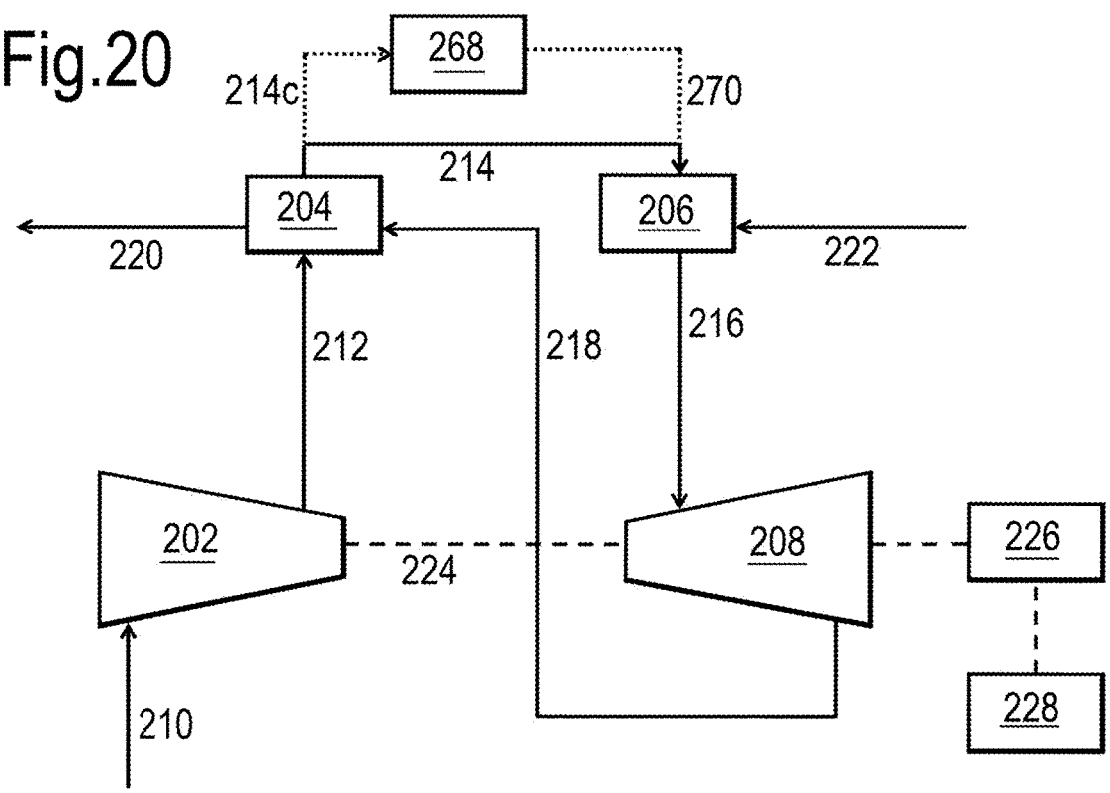

Fig. 27

Start up Auxiliary compressor, 278 to provide compressed air to the system.

Start up Auxiliary burner, 274 to enable the rotary regenerator, 204 to heat stream 214.

Turbine, 208, and shaft compressors, 202a,202b start to spin. As the shaft compressors, 202a, 202b spin faster the mass flow through them increases and compressed air from shaft compressors is vented to atmosphere.

When flameless combustor inlet, 214, is high enough for flameless combustion of fuel, 234, auxiliary burner, 274 turned off and flameless combustor, 206 turned on.

Fuel input, 222, increased until rotational speed of shaft, 224, is high enough such that the mass flow through the compressors, 202a, 202b will be sufficient for the system to self-sustain without additional compressed air input from auxiliary compressor, 278.

Compressed air from shaft compressors, 202a, 202b directed to rotary regenerator, 204 and auxiliary compressor, 278 turned off.

Fuel input, 222, and load from generator, 228, manipulated until speed of shaft, 224, reaches design point.

ROTARY REGENERATOR

FIELD OF THE INVENTION

The featured device is a type of rotary regenerator or recuperator for use as a heat exchanger. Also described are gas turbine cycles that said rotary regenerators may be utilised in. Such regenerators and/or turbine cycles utilising them may be utilised in a range of applications, including but not limited to automotive applications and static generation.

BACKGROUND

A regenerative heat exchanger (or regenerator) is a type of heat exchanger designed to exchange heat between two streams of different temperature. The stream of hot fluid (typically a gas) is brought into contact with a solid thermal mass, or media, raising the temperature of the media for a length of time. Then, as a result of some switch in the flow paths, the stream of cold fluid is brought into contact with the now hot media for a length of time, transferring heat out via the same surfaces. The hot and cold fluids may pass in opposite directions (counter-flow) or in the same direction (co-flow), although the former is generally more effective.

This is distinct from a heat typical exchanger where the hot and cold streams are permanently sealed apart, and heat must continuously travel fully through the solid dividing media without the fluid streams ever being reversed.

'Ljungstrom' type rotary regenerators are those where a cylindrical thermal storage media formed from a mesh or honeycomb is rotated around its axis. In its simplest form the frontal face of the thermal storage media is divided into two nominally gas tight sections via a seal, and the hot and cold gases flow simultaneously through either section in a direction parallel to the axis of rotation, and normal to the frontal face of thermal storage media. As the thermal media rotates it absorbs heat from the hot stream before transporting this to the cold stream.

'Rothemuhle' type regenerators use the same principle, but instead utilise a stationary thermal storage wheel, with streams of fluid ducted through rotating hoods which guide the flow sequentially into different parts of the media, whilst sliding a seal face over the thermal storage wheel to prevent high pressure flow diverting into the low pressure stream.

U.S. Pat. Nos. 3,138,198A, 3,391,727A and 3,276,515A show rotary regenerators where the inlet and outlet ducts are orientated such that in-flow and out-flow to the device is parallel to the axis of rotation of the thermal media wheel. Thus, the seal between the hot and cold streams, which are usually at different pressures is formed on the surface of the thermal media wheel. Such regenerators can suffer from significant sealing problems as materials ideal for use as a high temperature thermal storage media do not lend themselves to significant pressure differentials or to withstand the wear of a sliding interface. For example, ceramic honeycomb structures have thin walls, and applying a forced sliding interface continuously to the front face of such media can cause them to crumble, which creates a clearance which undermines the seal.

Prior art such as U.S. Pat. No. 5,950,707A utilises novel sealing mechanisms for 'Rothemuhle' or 'Ljungstrom' type regenerators. Such seals use complex geometries and cannot be utilised with materials required for high temperature applications.

Other solutions (D. G. WILSON and T. KORAKIANITIS, *The design of high-efficiency turbomachinery and gas turbines*, $2^{nd}$ ed., Massachusetts Institute of Technology, 2014.) have also used indexed rotation, whereby the seal on a thermal media wheel is formed temporarily via a mechanically deployable seal (perhaps hydraulic or pneumatic) which engages when the thermal storage wheel is stationary, which disengages to allow the wheel to rotate and switch over the access to and from the hot and cold streams. The advantage is that the seal face need not slide over the thermal media wheel, and instead can engage gently down onto the thermal wheel face. The disadvantage is that while the seal in not engaged, leakage occurs from the high to low pressure streams, requiring that the wheel (or sealing mechanism) be quickly rotated to minimise this. Such a regenerator is thus mechanically more stressed than a continuous rotation regenerator due to reciprocal and more rapid motion, reducing the life of any bearings, and the sealing requires active control with more moving parts and sub-systems operating all at high temperatures, thus reducing reliability.

Conventional regenerators suffer a phenomenon known as 'carry-over loss' when exchanging heat between streams of differential pressure. Carry-over loss occurs because a volume of high-pressure gas is periodically sealed in the air space inside the thermal media, and then released into the low pressure stream. The work required to pressurise this volume of gas would be passed to the system outlet in the form of a burst of flow. Conversely, the volume of low-pressure gas carried over to the high pressure stream causes a burst of flow into the regenerator media to equalise pressures. In the case of a gas turbine cycle carry-over loss has the effect of reducing the available high pressure flow through to a turbine and increasing the wasted compression work by exhausting high pressure fluid, therefore resulting in a decrease of system efficiency. A typical design requirement could be to ensure the mass flow of gas carried over is small compared to the nominal mass flow of gas through the system, perhaps below 1%.

Regenerators are often utilised as part of a larger system, such as a system implementing a gas turbine cycle. A commonly utilised gas turbine cycle is the regenerative open Brayton cycle. Working-fluid, typically air, is drawn from the atmosphere, compressed, raised in temperature from the turbine exhaust using the regenerator and raised in temperature further using a heat input (typically using a fuel in a combustor). A turbine extracts work and reduces the temperature and pressure of the fluid. The exhaust from the turbine is used to pre-heat the incoming compressed working-fluid. Often the turbine can drive the compressor directly being attached via a common shaft and additionally drive a generator for the generation of electric power. Matching components within the cycle to complement each other can maximise the efficiency of the cycle.

The thermal efficiency of a gas turbine cycle, defined as the ratio of power generation to thermal energy input (typically via combustion of fuel), typically increases with size (Bejan, A., Lorente, S., Yilbas, B., & Sahin, A. (2011). The effect of size on efficiency: Power plants and vascular designs. International Journal of Heat and Mass Transfer, 54(7), 1475-1481). Single turbine cycles generating <50 MW net power output typically do not reach efficiencies greater than about 35%. This is because larger turbines lend themselves to be more complex (e.g. through blade cooling technology, or steam injection at the combustion stage). Added complexity, use of exotic metals, and/or requirements to purify water for steam injection results in added costs, which are only acceptable at larger scales. It is possible to increase the net power output of the cycle by using a combined cycle system, whereby a gas turbine cycle is combined with for example a steam cycle that extracts more energy from the turbine exhaust. Combined cycles, such as a Brayton cycle combined with a steam cycle, add complexity and typically are not feasible on a small scale due to cost, difficulties forming steam and availability of small scale steam turbine technology.

An open Brayton cycle will also typically suffer from the formation of Nitrous oxides ($NO_x$) pollutants. Large scale gas turbine systems can utilise exhaust treatment systems to remove the majority but not all pollutants, however, this treatment adds complexity, cost and space usage for small scale gas turbine systems.

Brayton cycles on a small scale require turbines that can be suitably efficient. At high temperature and at low power output, this requires finding an effective heat recovery device that can extract enough heat from the turbine exhaust such that combined cycles are not necessary to raise the efficiency (such as a rotary regenerator as described above), as well as finding a low emissions combustor that can combust the desired fuel without requiring a cooling fluid which would decrease efficiency.

High efficiency (>40% thermal input to electrical generation) Brayton cycles exist in prior art, however these systems typically require large scale implementation to achieve these efficiencies at a reasonable cost. For example, U.S. patent 66/224,7062 shows a semi-closed Brayton cycle which utilises pure oxygen as the oxidising agent, thus changing the working fluid from air to a water, carbon dioxide, and oxygen mix and thus removes the possibility of $NO_x$ emissions. This system is necessarily more complicated because of the air separation required and would only be feasible on large scales. Similar semi-closed systems which utilise an alternative working fluid to air exist (such as the Allam cycle, which uses supercritical carbon dioxide), however these all suffer from greater complexity than an open Brayton cycle. (Before any other considerations come into play, there is the fact that whereas air is freely available from the atmosphere, these alternative working fluids must be provided specially. The requirements of doing so will mean that a cycle using an alternative working fluid will always be more complex than an otherwise equivalent cycle using air as the working fluid.)

Other prior art uses the Brayton cycle with an intermediate heat input to remove the associated problems relating to emissions, system integration and design of combustor that arise from combusting hydrocarbons to provide the thermal energy. U.S. Pat. No. 5,873,250A describes an open Brayton cycle with efficiency of 48-50% powered by stored thermal energy for use on electrified automotive units. This patent describes the possibility of combusting a fuel to regenerate the stored thermal energy, however the low-polluting nature of the invention would be compromised by this act resulting in a high emission cycle.

Other open Brayton micro-turbine cycles exist but are generally not intended for efficient electrical power generation. An example of micro-turbine systems using the Brayton cycle are shown in prior art such as U.S. Pat. No. 6,170,251B1. This prior art describes a micro-turbine system that provides a secondary output of compressed air. The power generation efficiency of this system will therefore be low as most of the work of the turbine is used to compress air.

High efficiency micro-turbines using the Brayton cycle can be realised by adding complexity to the cycle. For example US patent 20120324903A1 describes a high efficiency multi spool Brayton cycle with intercooling between compressors on separate spools. Or U.S. Pat. No. 9,279,364B2 describes a gas turbine cycle with multiple combustors. This type of complexity adds inherent complications to the control of the cycle and to the overall design of the system, and thus, if built on a micro-turbine level would not be cost effective.

There remains a need for a high efficiency, low complexity, gas micro-turbine cycle that is feasible at a small scale and capable of utilising multiple fuels whilst continuing to have low emissions.

SUMMARY OF INVENTION

In a first aspect the invention provides a regenerative heat exchanger module comprising:
  a) a chamber;
  b) at least one first inlet and at least one first outlet to the chamber, for passage of part at least of a first fluid stream;
  c) at least one second inlet and at least one second outlet to the chamber, for passage of part at least of a second fluid stream; and
  d) at least one rotatable body within the chamber mounted for rotation about an axis;
  wherein the at least one body comprises a plurality of fluid flow passages extending transversely of the axis of rotation and separated by a fluid permeable heat transfer medium, the plurality of fluid flow passages being arranged such that in use:
  a) in a first rotational position the plurality of fluid flow passages are aligned with the at least one first inlet and at least one first outlet, such that the part at least of the first fluid stream passes through the at least one first inlet into at least one of the fluid flow passages, through the fluid permeable heat transfer medium into at least one adjacent fluid flow passage, and through the at least one adjacent fluid flow passage into the at least one first outlet, and
  b) in a second rotational position the plurality of fluid flow passages are aligned with the at least one second inlet and the at least one second outlet, such that the part at least of the second fluid stream passes through the at least one second inlet into at least one of the fluid flow passages, through the fluid permeable heat transfer medium into at least one adjacent fluid flow passage, and through at least one adjacent fluid flow passage into the at least one second outlet.

For the purposes of the present invention, the term "first inlet" can be understood to mean "first stream inlet", in the sense that the function of the at least one first inlet(s) is to permit the first fluid stream ingress into the chamber. Likewise, the term "first outlet" can be understood to mean "first stream outlet", in the sense that the function of the at least one first outlet(s) is to permit the first fluid stream to exit from the chamber. Likewise, the term "second inlet" can be understood to mean "second stream inlet", in the sense that the function of the at least one second inlet(s) is to permit the second fluid stream ingress into the chamber. Likewise, the term "second outlet" can be understood to mean "second stream outlet", in the sense that the function of the at least one first outlet(s) is to permit the second fluid stream to exit from the chamber.

Optionally, the at least one first inlet and at least one first outlet are circumferentially opposite one another, and the at least one second inlet and at least one second outlet are circumferentially opposite one another.

Optionally, the at least one of the fluid flow passages that the part at least of the first fluid stream passes into from the at least one first outlet in the first rotational position is also the at least adjacent flow passage from which the part at least of the second fluid stream passes into the second outlet in the second rotational position, and wherein the at least one adjacent flow passage from which the part at least of the first fluid stream flows into the at least one first outlet in the first rotational position is also the at least one of the fluid flow passages into which the part at least of the second fluid stream flows into in the second rotational position.

Optionally, the rotatable body is housed in a rotor drum and the rotor drum is housed within a pressure vessel, such that the rotor drum is adapted to rotate with the rotatable body and the pressure vessel remains stationary. Where this is the case, the heat exchanger can optionally further comprise external penetrations in the pressure vessel and the rotor drum which align in the first rotational position to seal with the first inlet and the first outlet, and in a second rotational position to seal with the second inlet and the second outlet, and said penetrations in the stationary pressure vessel and in the rotor drum also align with at least one of the plurality of the fluid flow passages in the fluid permeable heat transfer medium.

Optionally, where a pressure vessel and rotor drum are used, there is a circular sliding interface between the stationary pressure vessel and the rotor drum enabling a seal tight engagement to block passage of a second fluid stream in a first rotational position, and to block passage of a first fluid stream in a second rotational position.

Optionally, the fluid permeable heat transfer medium is arranged in a honeycomb matrix structure, or mesh, or as honeycomb blocks stacked together.

Optionally, the at least one first inlet, at least one first outlet, at least one second inlet, at least one second outlet, the fluid permeable heat transfer medium and the plurality of fluid flow passages are coplanar with respect to a plane perpendicular to the axis of rotation.

Alternatively, a more complex arrangement may be used, wherein:

i) the at least one first inlet and at least one first outlet are not coplanar with one another with respect to a plane perpendicular to the axis of rotation;

ii) the at least one second inlet and at least one second outlet are not coplanar with one another with respect to a plane perpendicular to the axis of rotation;

iii) the plurality of fluid flow passages are distributed along the axis of rotation such that at least one fluid flow passage is coplanar with respect to a plane perpendicular to the axis of rotation with each of the at least one first inlet, the at least one first outlet, the at least one second inlet, and the at least one second outlet;

iv) the fluid permeable heat transfer medium is distributed along the axis of rotation, such that in a first rotational position the part at least of the first fluid stream passes from a fluid flow passage coplanar with respect to a plane perpendicular to the axis of rotation with the at least one first inlet through the fluid permeable heat transfer medium into at least one adjacent fluid flow passage coplanar with respect to a plane perpendicular to the axis of rotation with the at least one first outlet, and in a second rotational position the part at least of the second fluid stream passes from a fluid flow passage coplanar with respect to a plane perpendicular to the axis of rotation with the at least one second inlet through the fluid permeable heat transfer medium into at least one adjacent fluid flow passage coplanar with respect to a plane perpendicular to the axis of rotation with the at least one second outlet.

Where the more complex arrangement is used, optionally the at least one first inlet is coplanar with respect to a plane perpendicular to the axis of rotation with the at least one second outlet, and the at least one second inlet is coplanar with respect to a plane perpendicular to the axis of rotation with the at least one first outlet.

Optionally, the first fluid stream has a higher pressure than the second fluid stream, and wherein the second fluid stream enters the heat exchanger at a higher temperature than the first fluid stream, and wherein the first fluid stream exits the heat exchanger at a higher temperature than when it entered and the second fluid stream exits the heat exchanger at a lower temperature than when it entered.

In another aspect the invention provides an assembly of at least two regenerative heat exchangers as described above, coupled to allow passage of the first and second fluid streams between heat exchangers.

In another aspect the invention provides a system for putting into effect a turbine cycle, comprising a turbine, a combustor, and at least one regenerative heat exchanger or assembly of multiple heat exchangers as described above. The turbine may be an out-runner turbine primarily comprising ceramic material. The combustor may be a flameless combustor system comprising a combustion chamber extending longitudinally through which an oxidising agent flows in the longitudinal direction from an inlet to an outlet, and at least one fuel line; wherein at least one fuel injection pipeline in fluid communication with the fuel line extends through a wall of the combustion chamber, wherein each fuel injection pipeline contains at least one fuel injector for injecting fuel into the combustion chamber.

In another aspect the invention provides an automobile or engine for an automobile comprising at least one regenerative heat exchanger as claimed in any of claims 1-11, an assembly of at least two regenerative heat exchangers as claimed in claim 12, or a system as claimed in any of claims 13-15.

In another aspect the invention provides a static generator comprising at least one regenerative heat exchanger as claimed in any of claims 1-11, an assembly of at least two regenerative heat exchangers as claimed in claim 12, or a system as claimed in any of claims 13-15.

BRIEF DESCRIPTION OF THE DRAWINGS

FIG. 19: As FIG. 12 but including an optional extra motor for start-up purposes.

FIG. 20: As FIG. 12 but including an optional electric air heater for start-up purposes.

FIG. 27: Shows general start up procedure for a static generation system as depicted in FIG. 25.

DETAILED DESCRIPTION

Figure 1:
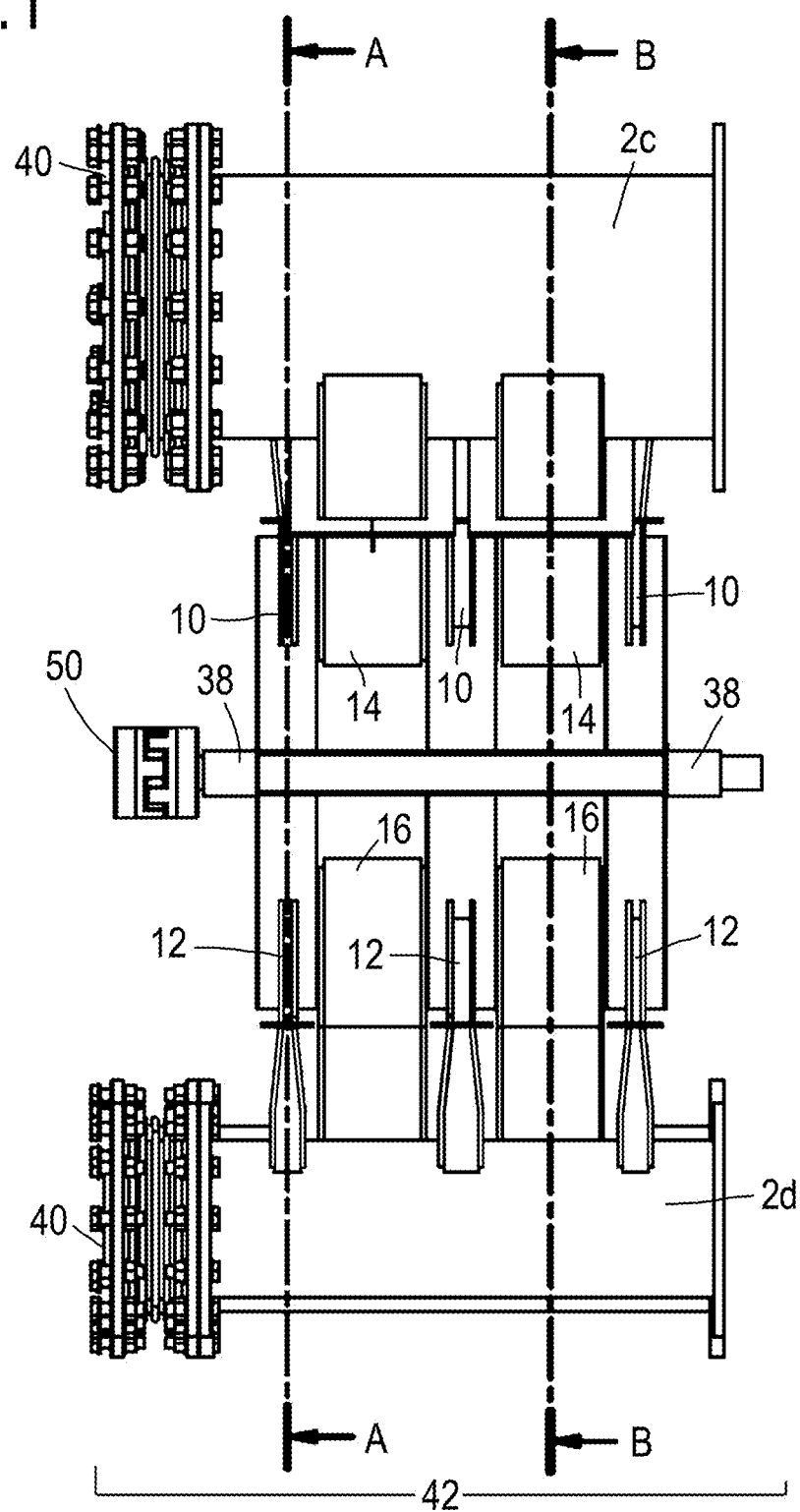
FIG. 1 depicts a module of a modular regenerator according to the present invention.

The present invention is a heat exchanger with rotary components. The invention could be arrived at with a simple geometry, wherein the inlets and outlets and the fluid permeable heat transfer medium are all coplanar with respect to a plane perpendicular to the axis of rotation, and as the rotatable body 160 is rotated the fluid permeable heat transfer medium is exposed first to the first inlet 110 and first outlet 116, and then to the second inlet 112 and second outlet 114, such that fluid flows alternatingly from the first inlet to the first outlet and then from the second inlet to the second outlet through the fluid permeable heat transfer medium 122.

Depicted in FIG. 1 is a more complex arrangement. FIG. 1 depicts a high temperature rotary regenerative heat exchanger comprising at least one thermal wheel unit made from a suitable high temperature material, or thermal media, such as a ceramic honeycomb housed within a suitable pressure vessel, or module.

The classic problems of sealing against the frontal face of a honeycomb thermal media wheel are circumvented in the present invention by using a radial in-flow and out-flow of the hot and cold fluids to the chamber (containing the thermal wheel). Fluid flow enters and leaves the chamber in directions perpendicular to the axis of rotation of the thermal wheel. This is distinct from prior art where the flow enters parallel to the axis of rotation, normal to the open face of the thermal media. The present invention allows highly effective heat exchange between two streams, a hot and a cold stream, that may have differential pressures.

FIG. 1 depicts a single module, of which at least one is constructed, the exterior of which is a stationary pressure vessel such as a closed cylinder. Within each stationary pressure vessel is an internal rotor drum, preferably stainless steel, which can rotate, and houses at least one thermal wheel. Multiple modules can, as well be depicted later, be connected in series.

Preferably the flow path through the thermal media (i.e. along the channels of a honeycomb matrix, or through a mesh) is aligned with the axis of rotation of the rotor drum. The rotor drums can be slowly rotated by a suitable drive system, typically no more than about 10 rpm.

In instances where modules are connected in series the rotational speed of the shaft can be specific to each module or consistent between all modules within the rotary regenerator. An increase in rotational speed will result in an increase in heat exchange effectiveness ($\eta_{eff}$), defined as the ratio of the actual heat transfer over the maximum possible heat transfer. However an increase in rotational speed also results in an increase in carry-over loss, which translates to an increase in the parasitic load required to compress the high pressure, cold stream. Therefore for each application, depending on different process variables which include, but are not limited to, flow rates, acceptable carry-over loss, desired effectiveness ($\eta_{eff}$), number of modules used, size of module, and pressure differential, there will be an optimum rotational speed. The optimum rotational speed is dependent on the operator's desired outputs in relation to the application specific process variables whereby the trade-off between effectiveness ($\eta_{eff}$) and carry-over loss is as desired for that particular application.

For example, in a typical gas turbine cycle, the trade-off between carry-over loss and effectiveness ($\eta_{eff}$) will manifest itself in a curve of thermal efficiency of the cycle against rotational speed, assuming all other variables are kept constant. The shape of the curve is dependent on the other components in the cycle and how the carry-over loss and effectiveness ($\eta_{eff}$) of the regenerator effect to the particular cycle. In the case where the operator wants to maximise thermal efficiency of the gas turbine cycle, the optimum rotational speed of the regenerator will be at the peak of the curve. It may be desirable in some gas turbine cycles, or other applications, whereby the temperature output of cold input stream needs to be maximised, or whereby the carry-over loss needs to be minimised (at the expense of effectiveness). Hence the optimum rotational speed may not correspond to the maximum thermal efficiency of the cycle.

The hot and cold streams are ducted into and out from the exterior of each module via external penetrations in the vessel. Penetrations, or reveals, are made in the rotor drums such that, at certain angular positions, the stationary external penetrations align with the rotating inner penetrations, thereby allowing a radial in-flow of one stream into, and its respective out-flow from, each rotor drum through ducting for the fluid flow, preferably made from stainless steel and lined with insulation where necessary. The ducts can be fabricated or cast or manufactured in any way known to those skilled in the art. At any given time, a module will be either admitting flow between the inlet and outlet of the hot stream, or the inlet and outlet the cold stream, or neither. Preferably, the reveals in the vessel and drum can be spaced to align with the passages formed either side of, or between, the ceramic honeycomb blocks. Preferably the reveals are placed radially opposite such that each hot or cold streams each have an open flow path for up to 180 degrees of rotation. The circumferential positioning of the reveals will dictate the amount of rotation for each cycle, which can be varied within the scope of the present invention.

A circular sliding interface exists on the inside of the external stationary pressure vessel and the exterior of the rotor drum, and this interface thereby forms the seal which blocks off flow from one stream whilst admitting the other.

Preferably, if using honeycomb media, the channels will be a square in cross section, which allows the walls to have constant thickness. Other shaped holes such as circular holes would also function within the scope of the present invention, but this is less preferable since the walls would generally have variable thickness, reducing the penetration of heat and creating thermal stresses. Typically, the honeycomb holes would be around 0.5 mm to 2 mm in width. The size and cross-sectional shape of the honeycomb is dependent on the application and is not limited to a square cross section or to a particular width or height.

The thermal media can be constructed from any material with suitable heat capacity, thermal conductivity, thermal expansion, thermal shock properties and temperature resistance for the temperature and pressures of the hot and cold flows. Suitable materials may include, but are not limited to the material families of cordierite, mullite, alumina, calcium silicate, silicon carbide, and silicon nitride.

Preferably, when a rotor drum is half way between being aligned with the two steams, to avoid ever being open to both streams at once, there is a small subtended angle whereby neither is open, and sufficient angular spacing is present to form a seal. Thus reveals can be sized so that streams are open for drum rotation angles less than 180 degrees.

Preferably, multiple modules are used to ensure that the hot and cold streams always have a flow path through the regenerator and as such will never be shut off. Each module can be phased sequentially such that both hot and cold streams always have at least one module with an open flow path, yet each forms a tight seal when positioned between the reveals for either stream. Sequential phasing can be enacted through reveal positioning and sizing in the rotor drum and external drum penetrations or through rotational position of the rotor drum within each module. For example the shaft that is connected to the rotor drum of one thermal wheel unit may also connected to other thermal wheel units in separate modules thus allowing simultaneous rotation of all thermal wheel units within the rotary regenerator.

If the regenerator consists of multiple modules, each module will be connected by suitable piping well known to those skilled in the art such that the modularity aids the replacement of modules in the case of malfunction. Preferably, bellows or other expansion joints are used to allow for thermal expansion between the pipes connecting between different modules.

Preferably a stub-axle shaft can be attached to either end of each unit to transmit drive torque along a train of modules.

Preferably, the stub axles can sit on suitable bearings to carry the weight of the module back to a suitable frame. Otherwise the unit can be supported on the external vessel, or a combination of both, optionally using a height adjustment mechanism to vary the load path.

Optionally, the present invention could be interpreted so as to operate with hot and cold stream flows, which are neither continuous nor concurrent for example batch type applications, in which case a single module could also suffice. (A single module is essentially a batch regenerator, but if multiple modules are linked in series continuous operation can thereby be enabled.) If flows are continuous or concurrent in a particular application, a single module can be utilised if backpressures and modulating flow downstream from the regenerator can be accommodated. In most applications where flow is continuous or concurrent, for example typical gas turbine cycles, it is advantageous to set up the regenerator with multiple modules to avoid any back pressure or modulating flow. The number of modules and phasing of the reveals will be selected based on applicable characteristics of the application including, but not limited to, the flow rates and pressures, the volume of the modules, geometry of the reveals, cost of manufacturing, regenerator effectiveness ($\eta_{eff}$), specific flow path in the module, and capability to deal with modulating flows and back pressures. Multiple modules also have the advantage of allowing an integration of potential redundancy, whereby the malfunction of one module does not result in downtime for maintenance of the whole regenerator.

Optionally, a multiple module regenerator could be integrated into single module unit with an internal dividing wall.

Optionally, rather than the external pressure vessel sliding against the rotor drum, internal wear plates can be attached inside the external pressure vessel which can be replaced more cheaply. This requires that the wear plates have reveals matching that of the external pressure vessel so to not obstruct the flow and can be held stationary. Optionally, in addition, or as an alternative, a further wear plate could be added which is attached so to rotate with the drum for the same reason.

Optionally, said wear plates can be coated on their sliding interfaces with a suitable lubricant. One example of a high temperature solid lubricant is hexagonal boron nitride. Liquid lubricants such as oil-based lubricants may burn off at the temperatures otherwise enabled by ceramic thermal media, but it may be possible to mitigate this consumption of oil given the benefits of the system, or with other liquids. Thus, using either solid or liquid lubricants at the sliding interfaces do not depart from the present invention.

Optionally, the stationary wear plates can be separated from the external vessel by a layer of soft insulation. This acts both to protect the vessel from the high temperatures, but also helps to spread out the clamping load evenly onto the wear plate, creating a more even seal.

Optionally, the thermal media blocks might be cuboid shapes that can be stacked together into a single wheel layer such that the faces open to the flow on each block do not touch those of neighbouring blocks.

Optionally, rather than cuboidal blocks, the thermal wheel could use any other three-dimensional shape that satisfies the criteria above. For example, circular of segmental shapes are also within the scope of the present invention.

A layer of blocks can be encapsulated on their closed outer flat faces with layers of insulation which shield the rotor drum from the peak temperatures. The type and number of insulation layers within the drum will be chosen based on the shape of the rotor drum and vessel, the given temperature range that is necessary for the material choice of the metal drum and external vessel, and any structural requirements of the particular geometry. Materials used for insulation could be, but are not limited to, ceramic microporous, castable refractory, structural calcium silicate, felt insulation and ceramic fibre products.

Optionally, any insulation which is adjacent to the flow path can be protected by flow liners to protect from erosion caused by high velocity gases. Preferably these liners would use stainless steel and are formed simply from thin folded sheet. These flow liners can be sacrificial. Alternatively, the insulation could be chosen to be resistant to gas erosion and be used without a liner or have a suitable coating.

Preferably, the external vessel is constructed out of a top and bottom half which clamp together at a longitudinal flange on either side. This creates a preload to create the seal between rotating and stationary interfaces.

Having a radial in-flow and out-flow as described herein allows the design to be more compact than the prior art. This is because the thermal media can be stacked into multiple internal walls within the thermal wheel, with each internal wall separated by an offset which allows the flow to enter between wheels in open passages, turn 90 degrees, pass through the thermal media, turn 90 degrees, and flow out through open passages. Prior art thermal wheels require that all the flow enters the unit in the same direction parallel to the axis of rotation (i.e. normal to the open face of the thermal media), requiring all the thermal media to be arranged in a single plane, rather than several parallel planes. The present invention greatly reduces the cross-sectional size of the inlet and outlet ducting given the same quantity of thermal media, making the system more compact, reducing heat loss, and is stronger and cheaper to construct.

For the present invention, the volume of fluid carried over (regarding carry-over loss) also includes the open space inside the rotor between the thermal media, formed from the offset described above, up to the sealing faces. Thus in principle the carry-over loss is slightly higher than for a conventional thermal wheel design. However, the loss is mitigated by improvements such as scalability, compactness of design, sealing and reliability.

Optionally adjacent modules can be connected such that, to reduce carry-over loss, modules having completed their high pressure cycle (and, for example, being low temperature) can discharge their batch of pressurised air into a corresponding low pressure unit (for example being at high temperature prior to its introduction to the low temperature high pressure stream) until the pressures equalise, thereby recycling some of the internal pressure. This system can be extended to recycle pressurised air into a sequence of units or separate storage vessels to exchange and recycle ever greater factions of the pressure, albeit at increasing complexity.

Optionally, the carry-over loss could be recycled instead by discharging the high-pressure stream though a turbocharger or a wave-rotor, which uses the absorbed power to pressurise a low pressure module with fresh air at ambient pressure.

The principle of flow entering the modules radially (i.e. perpendicular to the axis of rotation) might be realised in several ways without departing from the scope of this invention, for example, having the sliding interface aligned parallel with the axis of rotation before turning through 90 degrees inside the module, rather than outside, to pass radially towards the thermal media.

The invention described herein also reduces cost, complexity and effectiveness ($\eta_{eff}$) of high temperature regeneration through the removal of high temperature material honeycomb seals. As opposed to the thermal media, neither the external stationary vessel nor the rotor drum needs to be formed from a high temperature material and can instead use a different, stronger, engineering material such as a grade of steel. Thus, the problems associated with sealing a, potentially honeycomb, high temperature thermal media is avoided. For example the problem of thin walls on honeycomb faces crumbling due to a sliding seal, or the problems of a complicated deployable seal interface are replaced by the simpler problem of designing a sliding interface in, for example, stronger and solid flat steel faces.

An example of the present invention is depicted in the figures. The particular example illustrated is intended for use as part of a gas turbine cycle. The invention allows fluid flow normal to the axis of rotation to enable heat exchange between two streams of differential pressure at high temperatures and/or high temperature differentials. Under preferable conditions there is a continuous flow of high and low pressure fluids throughout the regenerator with minimised carry-over loss due to direction of fluid flow. The description herein is based on heat exchange between a low pressure, high temperature inlet stream and a high pressure, low temperature inlet stream although any combination of temperature and pressure is achievable with the present invention, including streams of equivalent pressures.

Figure 2:
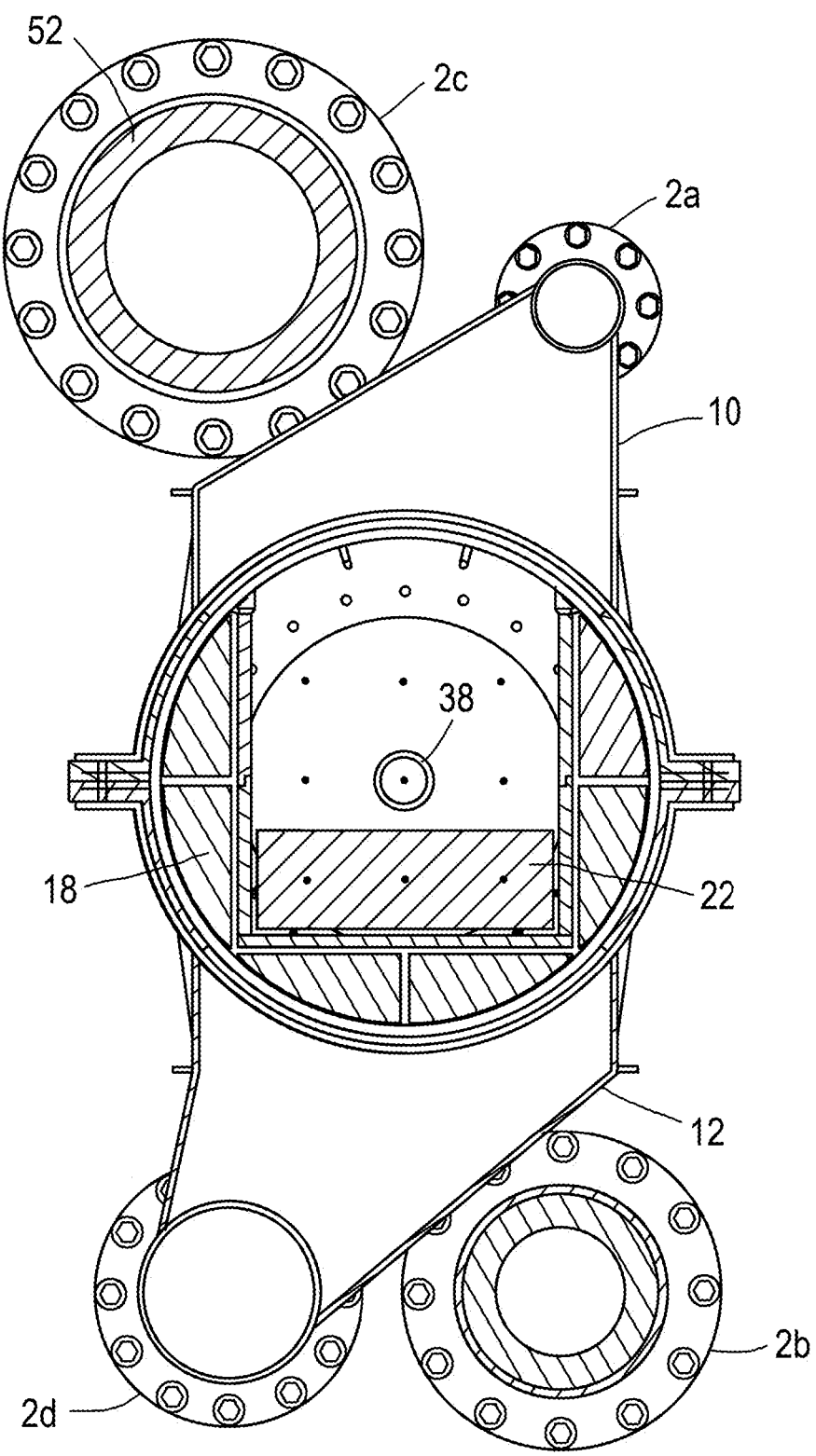
FIG. 2 depicts a sectional view of the module of FIG. 1, at the plane A-A.
Figure 3:
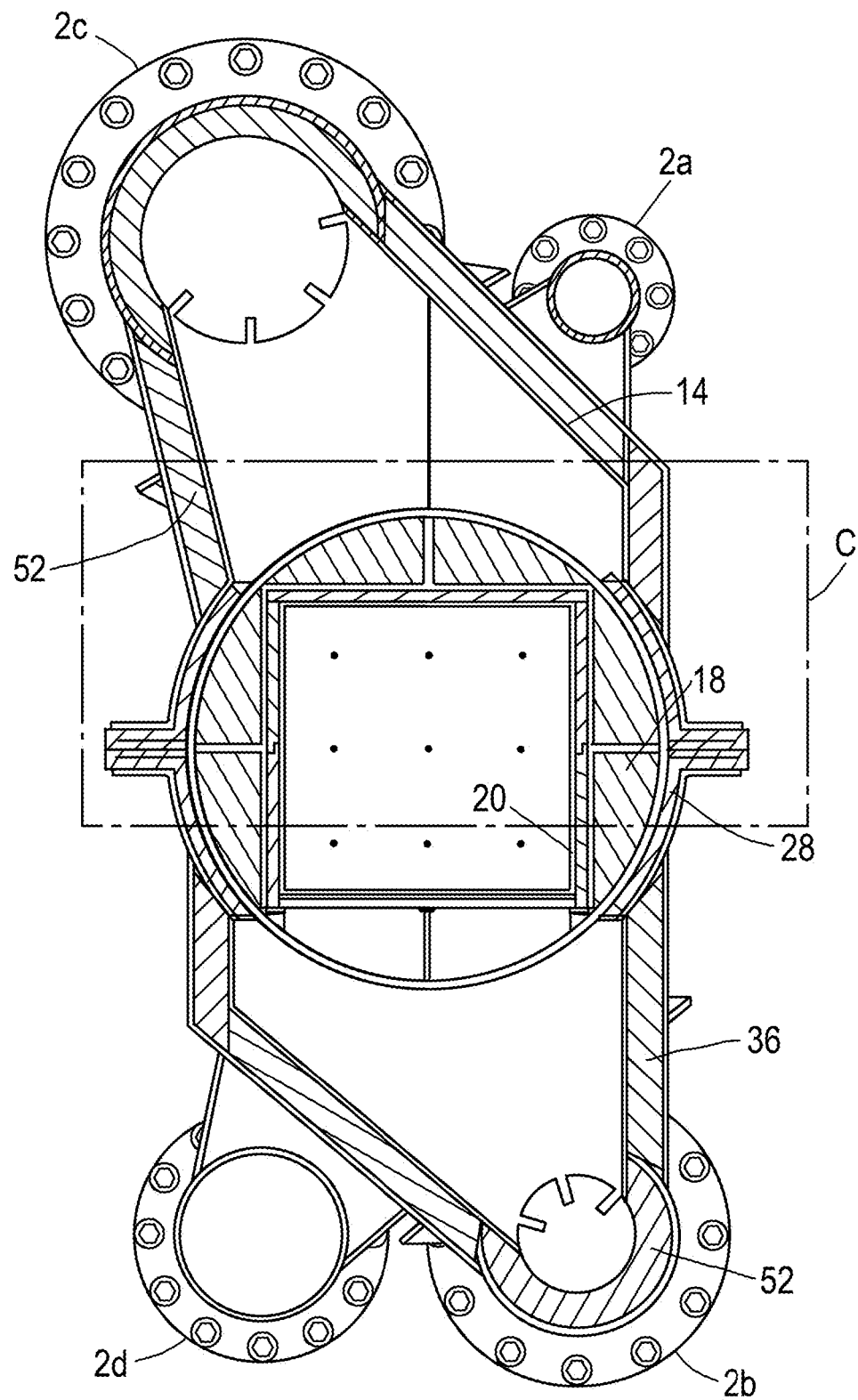
FIG. 3 depicts a sectional view of the module of FIG. 2, at the plane B-B.
Figure 4:
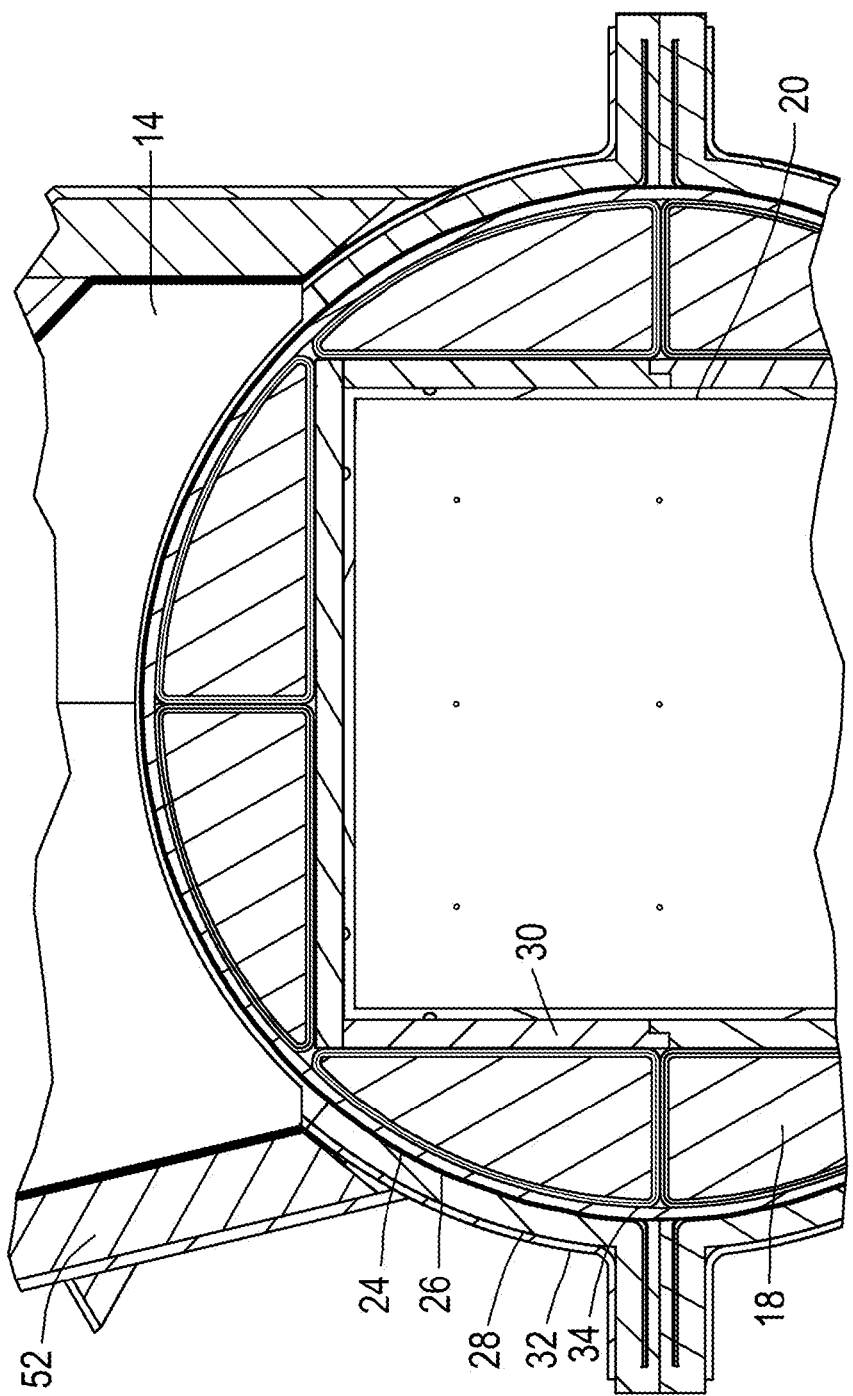
FIG. 4 depicts a detailed view of the boxed section C from FIG. 3.
Figure 5:
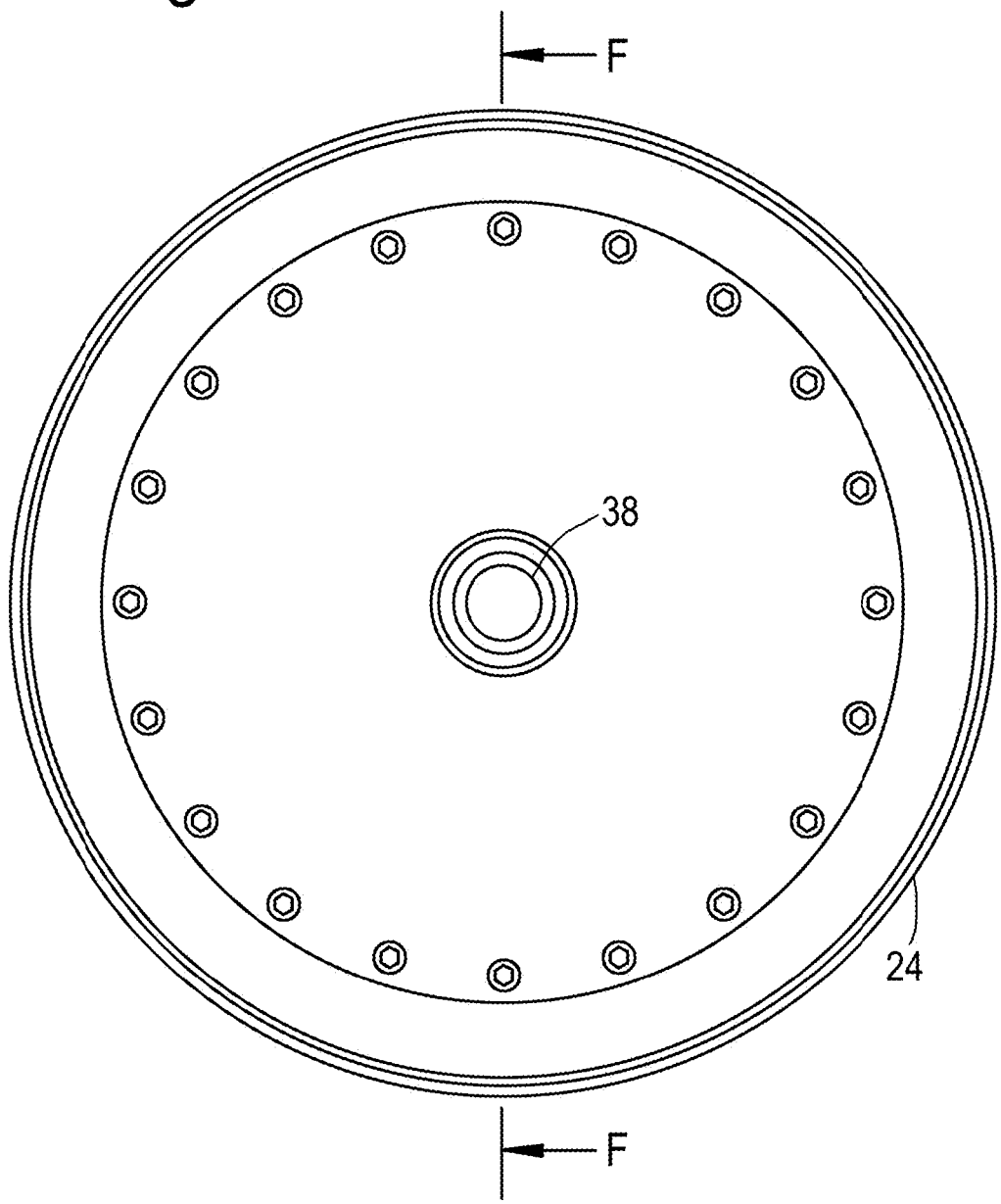
FIG. 5 depicts a drum from a modular regenerator according to the present invention.
Figure 6:
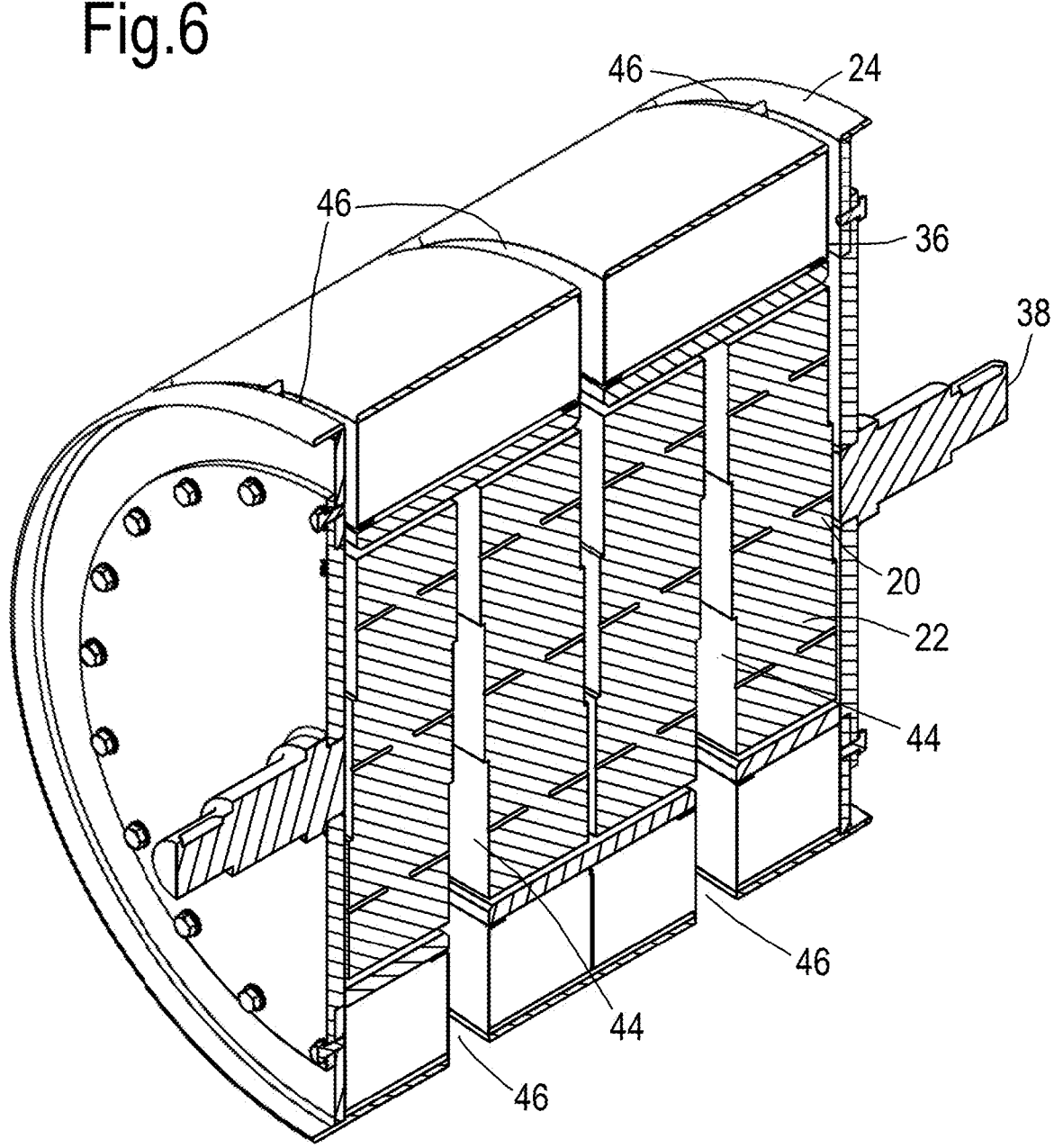
FIG. 6 depicts a sectional view of the drum of FIG. 5, at the plane F-F.

In the present invention the rotary regenerator contains at least one module 42 as depicted in FIG. 1. The rotating part of the thermal wheel unit 42 rotates with respect to an axis via stub shafts 38 connected to either side of a metal drum 24 (as depicted in FIG. 3). Inside the metal drum 24 is a cuboid ceramic honeycomb 20 surrounded (as depicted in FIGS. 2, 3 and 4) by layers of insulation of different geometries 18, 28, 30, 34 and 52, and duct flow liners 36. The cuboid ceramic is arranged via stacks of smaller honeycomb sections 22 with (as depicted in FIG. 6) open passages 44 normal to the direction of the honeycomb channels. The passages 44 are aligned with openings, or reveals 46 in the metal drum 24 which allow fluid communication between the cuboid ceramic honeycomb 20 and the inlet ducts 10, 14 and outlet ducts 12, 16.

Duct flow liners 36 protect the insulation layers 18 from adverse effects of gas velocity. Insulation layers and duct flow liners 36 extend to the hot inlet 14 and outlet 16 ducts. A wear plate 26 is surrounds the whole circumference of the rotating metal drum 24 and is held in place by the outer casing, or duct clamp 32. A layer insulation 28 surrounds the wear plate 26, decreasing the extent of heat transfer to the duct clamp 32. A suitable high temperature lubricant, hexagonal boron nitride in the present invention, coats the metal drum 24 touching face of the wear plate 26.

Parallel to the rotation axis are connection pipes 2a for high pressure input fluid, 2b for high pressure output fluid, 2c for low pressure input fluid and 2d for low pressure output fluid. Inlet ducts 10, 14 and outlet ducts 12, 16 perpendicular to the rotation axis allow fluid communication between the connection pipes 2a, 2b, 2c, 2b to the metal drum 24 through the inlet ducts 10, 14 and outlet ducts 12, 16 such that the inlet ducts 10, 14 and outlet ducts 12, 16 subtend from the connection pipe 2a, 2b, 2c, 2d circumference to the drum 24 circumference.

The metal drum 24 has reveals 46 sized to a portion of the circumference spaced longitudinally along the rotation axis to allow fluid communication, in the present embodiment, between the ceramic honeycomb 20 and the Inlet ducts 10, 14 and outlet ducts 12, 16. Reveals 46 are spaced radially opposite each other and staggered longitudinally along the metal drum 24 in order to correctly align with the relevant ducts and the open passages 44 within the cuboid honeycomb 20. The reveals 46 are circumferentially sized to span one side of the cuboid honeycomb 20 and longitudinally sized based on flow rate of fluid.

As the regeneration unit turns it cycles through a heating and cooling period. During the heating period the hot fluid reveals 46 allow fluid communication between the ceramic honeycomb 20 and the low pressure hot inlet duct 14. Hot low pressure fluid flows through the passages 44 into the honeycomb channels, which are parallel to the axis of rotation, through to passages 44 on the other side of the smaller stacked cuboid honeycombs 22 before passing out of the metal drum 24.

Thus the low pressure fluid fills the channels in the honeycomb stacks 22 transferring thermal energy to the honeycomb stacks 22. Simultaneously the cold fluid reveal allows fluid communication between the low pressure outlet duct 12 and the ceramic honeycomb cuboid 20. Therefore the reveals 46 are positioned such that the heating period allows fluid communication between the low pressure inlet duct 14, the cuboid honeycomb 20 and the low pressure outlet duct 12. The hot low pressure fluid flows from inlet duct 14 through the ceramic honeycomb channels, transferring thermal energy and decreasing in temperature, to the low pressure outlet duct 12 where it exits as a cold fluid.

During the cooling period, the reveals 46 align with the high pressure fluid inlet duct 10 and the high pressure outlet duct 16, thus allowing fluid communication between the high pressure inlet duct 10, the ceramic honeycomb 20 and the high pressure outlet duct 16. The high pressure fluid flows from the high pressure inlet duct 10 through the reveals 46 to the ceramic honeycomb 20 in a counterflow direction through the honeycomb channels compared to the hot cycle. The fluid rises in temperature by extracting thermal energy from the ceramic honeycomb stacks 22, and flows out through the reveals 46 to the high pressure outlet duct 16.

The unit repeats the cycles continuously thus heating the ceramic honeycomb stacks 22 with hot fluid and cooling it with cold fluid periodically transferring energy from the hot fluid to the cold fluid. The rotational speed is balanced (~1-10 rpm) to maximise heat exchange while minimising pressure losses, or carryover loss, in the system occurring during the changeover from hot cycle to cold cycle. Any low pressure fluid remaining in the honeycomb channels after the hot cycle will decrease the overall pressure of the high pressure, cold fluid entering the honeycomb channels during the cold cycle.

Figure 7:
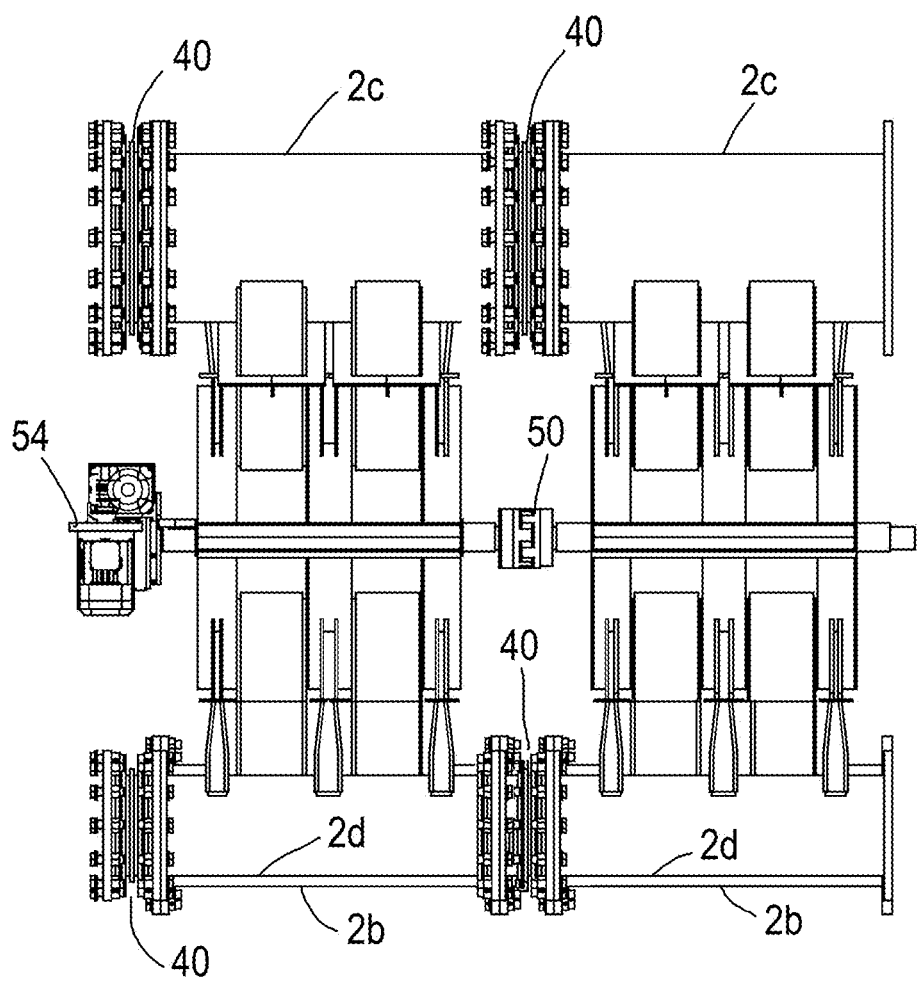
FIG. 7 depicts the connection between the module of FIG. 1 and an identical module in detail.
Figure 8:
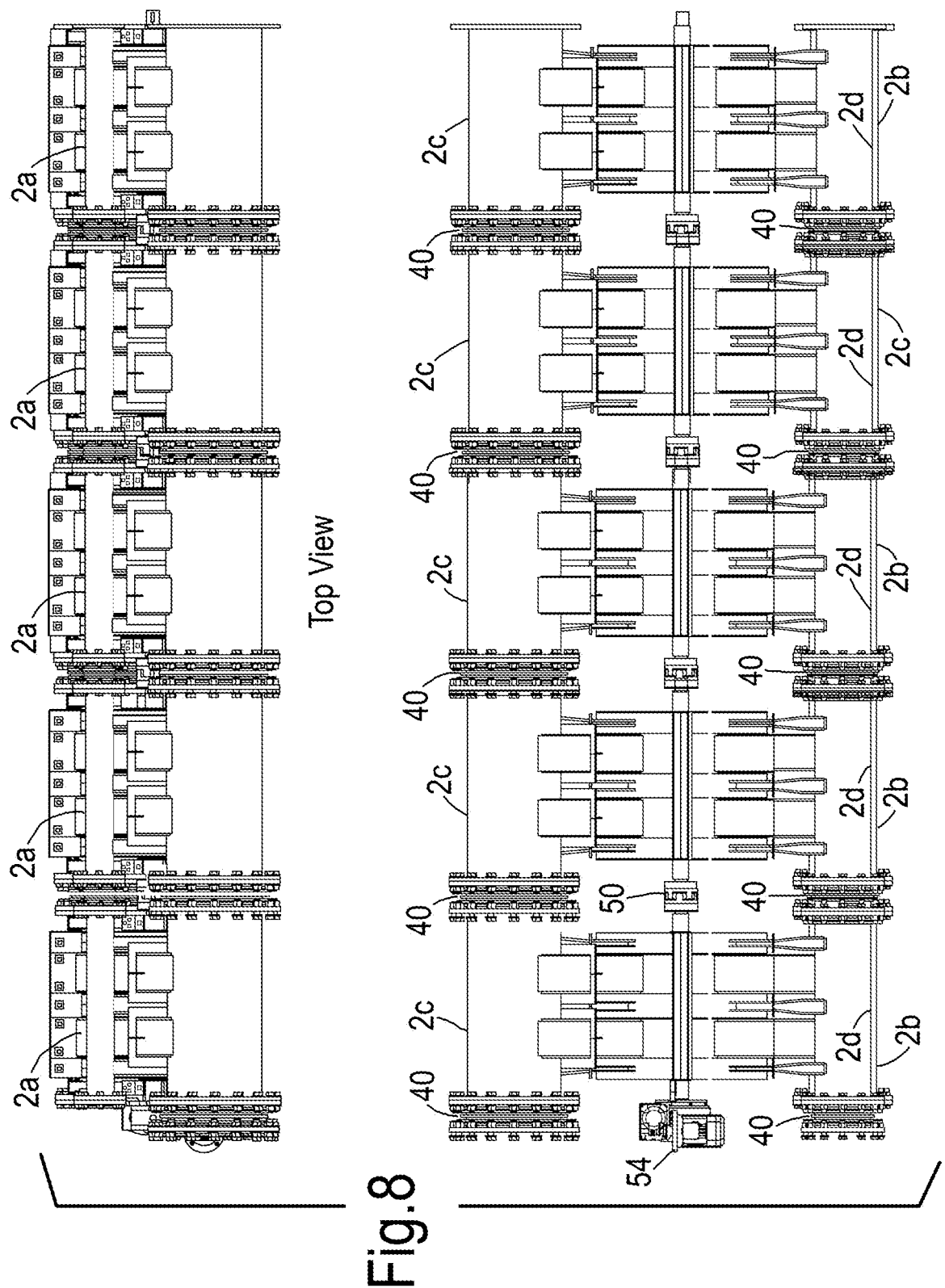
FIG. 8 depicts a series of five modules according to FIG. 1 in concert.
Figure 9:
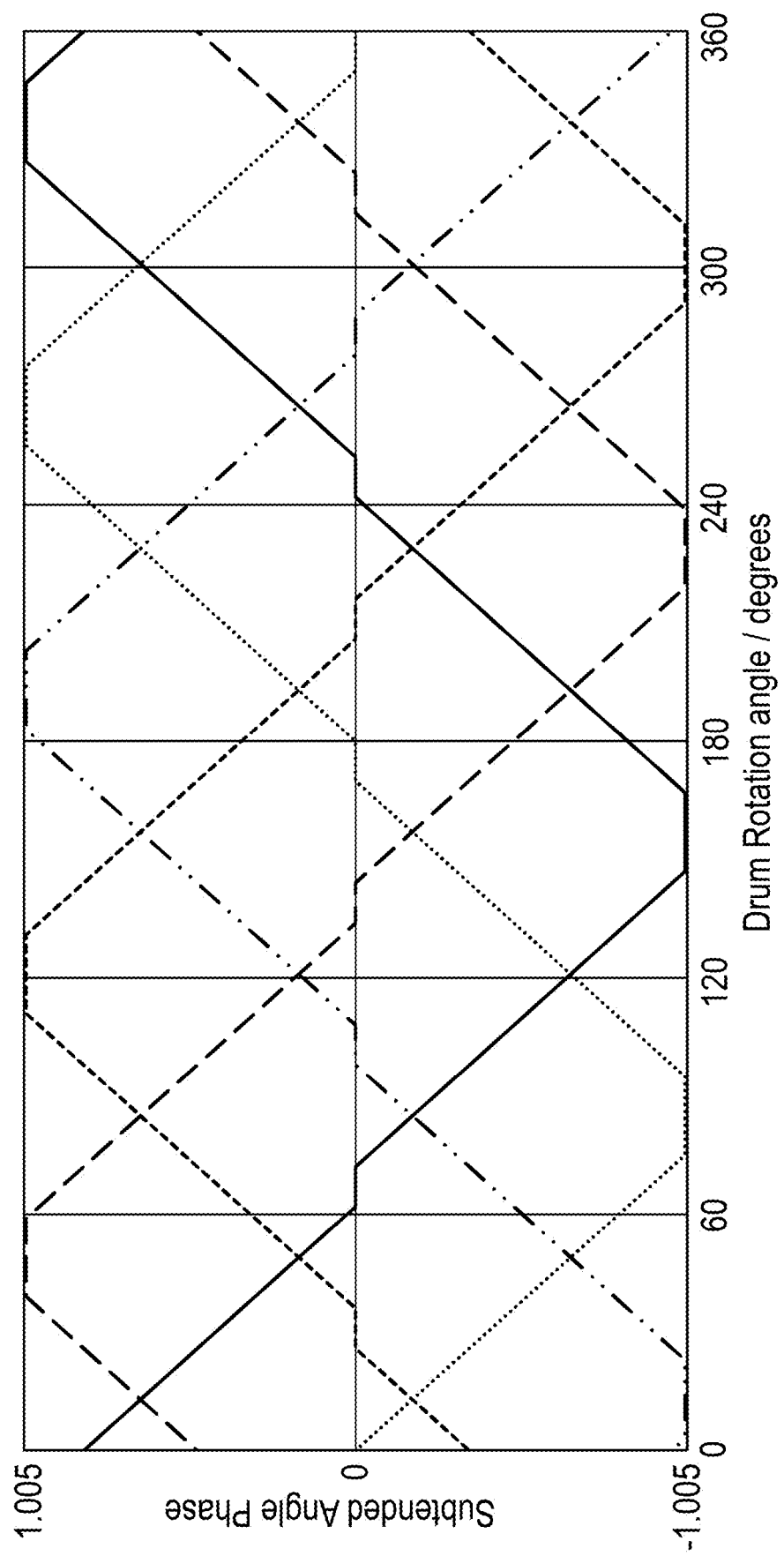
FIG. 9 is a chart of subtended angle phase against drum rotation angle for a series of five modular regenerators as in FIG. 1 connected in series.
Figure 10:
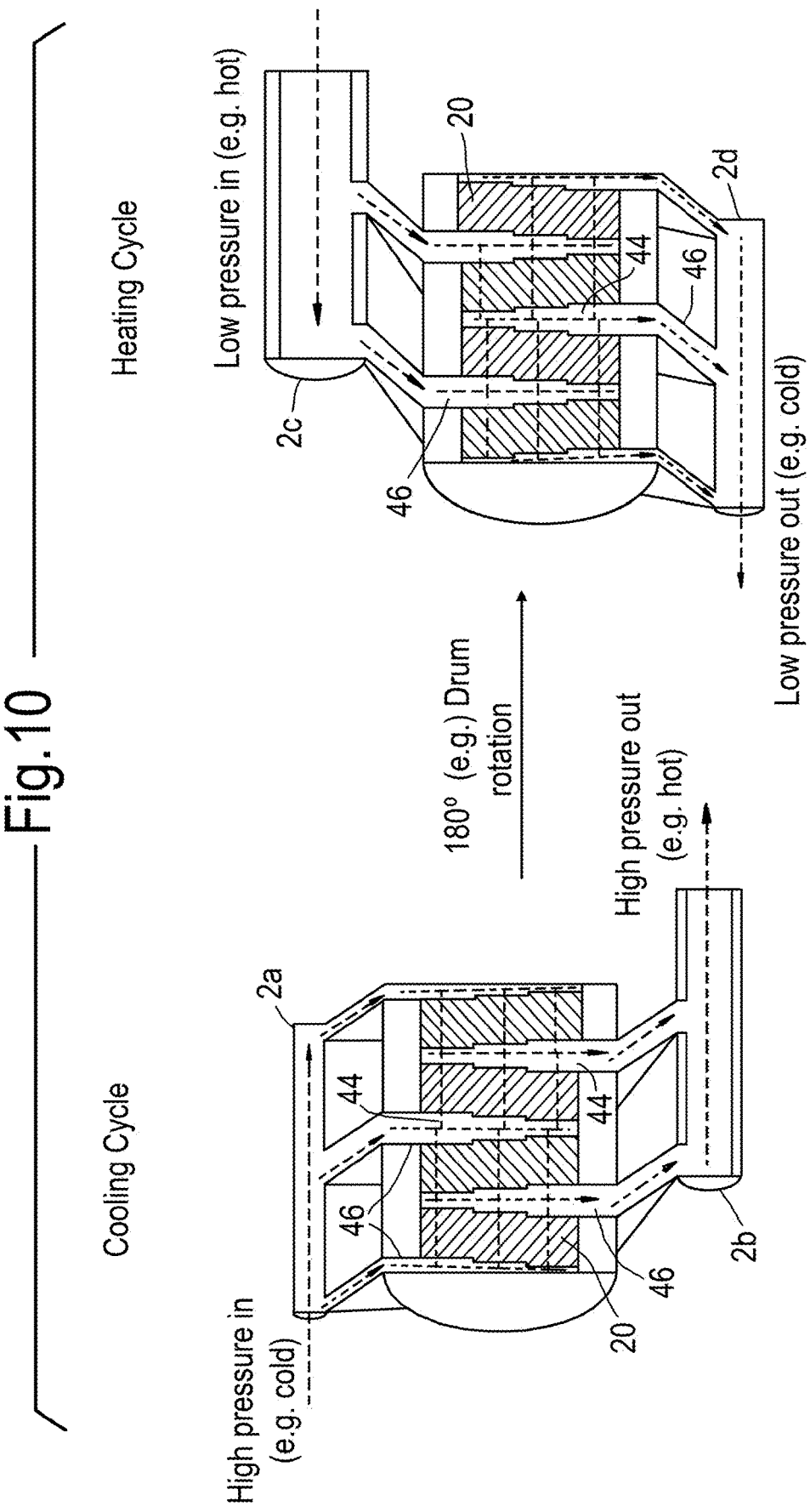
FIG. 10 depicts the flow of fluid through a modular regenerator as in FIG. 1 in the cooling and heating portions of the cycle.
Figure 11:
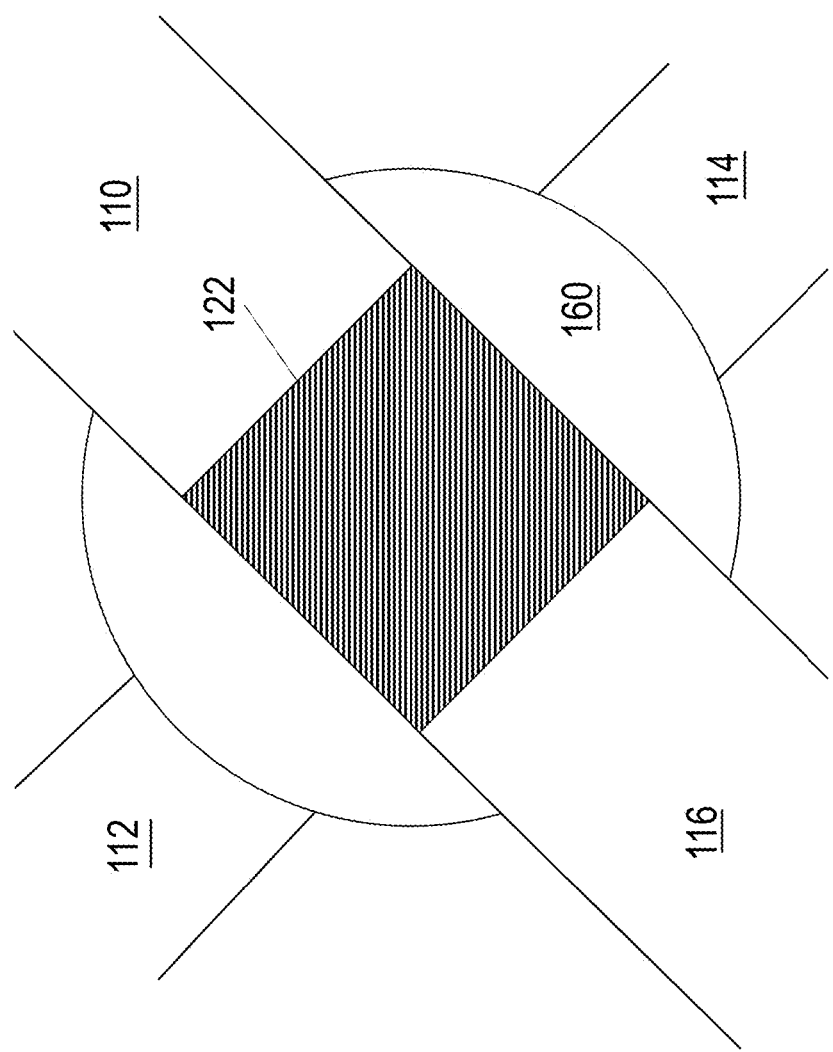
FIG. 11 depicts a greatly simplified version of the present invention in which almost all the components are coplanar with one another with respect to a plane perpendicular to the axis of rotation.

A single module 42 of the present invention can be used by itself, or can advantageously be connected to additional modules 42. For instance, one preferable embodiment of the present invention as depicted in FIG. 8 contains five rotary wheel units 42. FIG. 7 depicts in detail the connection points between two modules of the type depicted in FIG. 1 (as well as the motor 54 that provides rotational force). Each unit is connected via the connection pipes 2 through bellows 40 and the stub shafts 38 are connected through couplings 50. Through this arrangement the rotation of all the units can be driven by a single motor. Hot and cold periodic cycles of each unit are timed such that the low pressure and high pressure streams always have a path through the at least one module of the regenerator, and that the cross sectional area of the rotating reveals 46 open to low pressure and high pressure streams is constant or near-constant; this advantageously means that the rate of flow is constant or near-constant, eliminating or greatly reducing back pressure which would otherwise build up. FIG. 9 illustrates the cycle periods for the present invention. On the y-axis, the '1' represents maximum subtended angle with low pressure ducts 12, 14 and reveals 46 and '−1' indicates maximum subtended angle with high pressure ducts 10, 16 and reveals 46, or vice versa. The x-axis represents the angle (in degrees) of rotation.

The reveals in the metal drum and reveals 46 are sized according to the volumetric flow for that particular unit, as are the inlet and outlet ducts 10, 12, 14, 16 and connection pipes 2.

It will be appreciated by the skilled person that whilst in the present case the optimal number of modules required to ensure a constant or near-constant flow through rate is five, in other embodiments of the invention more or less modules may be required, depending on features such as the geometry of the reveals.

The rotary regenerator described herein is capable of transferring temperature from two high pressure, or two low pressure fluids rather than just from a low pressure to a high pressure fluid (or vice versa). No significant changes are required to enable the present invention to transfer thermal energy between two streams of equal pressure except manipulations to account for the volumetric change. As such the rotary regenerator can be preceded by a wave rotor, turbo compressor or compressor of any type well known to those skilled in the art to increase the low pressure inlet stream to a higher pressure. This has the advantage of reducing the carry-over loss.

Turbine Cycle Systems Incorporating Rotary Regenerator

One use of the rotary regenerators according to the present invention can be as part of a regenerative turbine cycle.

For instance, an extremely simple turbine cycle system of the open Brayton type can incorporate a rotary regenerator as described above, a combustor, and a turbine. The regenerator can be arranged to accept high temperature fluid exiting the turbine, and perform heat exchange between this and a low temperature, higher pressure fluid also input into the regenerator. The resulting high pressure, elevated temperature fluid can then enter the combustor at an elevated temperature, preferably above that of the auto-ignition temperature of the fuel the combustor is provided with, resulting in the combustor outputting a fluid at high pressure and even higher temperature. This fluid can then enter the turbine, which would extract work from it, and the exhaust from the turbine can re-enter the cycle at the regenerator.

An optional arrangement can involve a compressor for the inlet air, a rotating regenerator herein described to transfer heat from the turbine exhaust to the compressed air, a combustor to raise the temperature of the compressed air to the desired turbine inlet conditions and a turbine to extract work from the high temperature compressed air. The rotary regenerator described herein can accept high temperature fluid exiting a turbine and exchange this with low temperature fluid exiting a compressor. The low temperature fluid, upon leaving the regenerator, now high temperature can enter a high temperature combustor at temperatures greater than the auto-ignition temperature of the fuel. The combustor would therefore need to be a low emissions combustor capable of dealing with high temperature inlet air. The turbine would accept high temperature air from the combustor and would therefore have to be constructed from suitable materials to deal with high temperature inlet air, such a turbine may require relatively low rotational speeds based on the material specification. A compressor for the inlet air could be a high efficiency compressor capable of being shaft driven by the turbine and therefore would be capable of compressing the air at low rotational speeds. Such a cycle including the rotary regenerator described herein is capable of high efficiencies compared to other micro-turbine cycles.

In a particularly preferred embodiment the present invention discloses an open Brayton gas turbine cycle system, whereby working-fluid is compressed and heated using a high temperature heat recovery device such as a rotary regenerator as described above. The temperature of the compressed working-fluid is suitably high to be above the auto ignition temperature of the fuel of choice. This high temperature high pressure working-fluid is used as an oxidising agent in an ultra-low $NO_x$ emissions (<3 ppm) flameless combustor capable of receiving a high temperature oxidising agent and working with multiple fuels. The combustion working fluid, further raised in temperature via combustion of a fuel, is then delivered to a high temperature turbine, which extracts work from the fluid before the low-pressure exhaust is used in the rotary recuperator to heat the incoming high-pressure working fluid. The work can be converted into electrical power via a gearbox and a generator. Due to the high temperature regenerator recovering heat from the expander exhaust, the system air-fuel ratio is relatively high (typically greater than 1:20 by mass). This is because the heat recovery is very high and hence a smaller amount of heat input is required into the process at combustion stage to raise it to the turbine inlet temperature.

In a preferred embodiment along these lines, using a rotary regenerator according to the present invention, a preferred type of flameless combustor and a preferred type of high temperature turbine allows those components to each other in the following ways:

- The preferred type of high temperature turbine operates at a sufficiently high temperature and low pressure ratio such that the exhaust is greater than the auto ignition temperature of the input fuel. When working in conjunction with the rotary regenerator, the exhaust of the turbine can be used as the high temperature low pressure input fluid, and the regenerator can be used to transfer the heat from the exhaust to the high pressure low temperature working-fluid input to raise the temperature of the working-fluid to sufficiently above the auto ignition temperature of the fuel.
- The high effectiveness ($\eta_{eff}$) rotary regenerator according to the present invention ensures that the thermal efficiency of the system is high, that the optimum pressure ratio of the system is low, and that the input temperature to the combustor is above the auto ignition temperature of the fuel. (The optimum pressure ratio of the system is a function of regenerator effectiveness ($\eta_{eff}$), so a high effectiveness regenerator results in a lower optimum pressure ratio; in this case, the ratio may be about 3-4.)
- The rotary regenerator according to the present invention is able to handle high temperatures and able to effectively seal between two streams of differing pressures.
- The preferred type of flameless combustor is able to handle a high temperature inlet oxidiser, with no cooling fluid, and is able to combust the fuel without the formation of thermal $NO_x$, CO or particulates.
- Both the preferred type of flameless combustor and the rotary regenerator according to the present invention have a sufficiently low pressure drop to not affect the overall thermal efficiency of the system.

Preferred Type of Turbine: At its simplest, the preferred type of turbine is an out-runner turbine comprised primarily of ceramic material. Extensive examples of such turbines, suitable for use in Brayton cycle systems as described above, are provided in GB patent application nos. GB1804912.2, GB1709339.4, GB1702648.5 and GB1616239.8, and PCT application no. PCT/GB2017/052850. The entirety of all of these applications are incorporated herein by reference, and the claims thereof describe especially suitable examples of the preferred type of turbine.

For instance, the preferred type of turbine may be a turbine assembly comprising an axial turbine comprising an axially arranged series of rotor sections, wherein each rotor section comprises an outer ring and rotor blades and the outer rings of the rotor sections connect to form a rotating outer casing, wherein the rotor sections are made from reaction bonded silicon nitride (RBSN), and a turbine assembly comprising an external sheath providing structural support for the axial turbine, wherein the sheath is made from dense silicon nitride (DSN), wherein the rotor sections are fitted to the inside of the external sheath and the sheath and rotating outer casing are arranged to rotate together.

Where this is the case, the axial turbine may further comprise an axially arranged series of stator sections, wherein each stator section comprises an inner hub and stator blades and the inner hubs of the stator sections connect to form a stationary shaft, wherein the stator sections are made from reaction bonded silicon nitride. (Where this is the case, the axial turbine may further comprise at least one shroud comprised in an inner hub.) The axial turbine may further comprise at least one shroud comprised in an outer ring. The sheath may be made from DSN with a density above 96% of theoretical density. The sheath may be made of silicon nitride 282 or gas-pressure-sintered silicon nitride.

Alternatively, the preferred type of turbine may be an axial out-runner turbine comprising an axially arranged series of rotor sections, wherein each rotor section comprises an outer ring and rotor blades and the outer rings of the rotor sections connect to form a rotating outer casing, wherein the rotor sections are made from RBSN and have a radial size selected such that at a maximum shaft speed of the turbine the radial sections experience stress no greater than 100 MPa.

Alternatively, the preferred type of turbine may be an axial out-runner turbine comprising an axially arranged series of rotor sections, wherein each rotor section comprises an outer ring and rotor blades and the outer rings of the rotor sections connect to form a rotating outer casing, wherein the rotor sections are made from a silicon nitride other than RBSN (for example, gas pressure sintered silicon nitride, sintered silicon nitride, or recrystallised silicon nitride).

Alternatively, the preferred type of turbine may be an axial out-runner turbine comprising an axially arranged series of rotor sections, wherein each rotor section comprises an outer ring and rotor blades and the outer rings of the rotor sections connect to form a rotating outer casing, wherein the rotor sections are made from RBSN, sintered RBSN, or reaction bonded silicon carbide, and further comprise a reinforcing insert. (The insert may comprise a dense ceramic or carbon fibres.)

Alternatively, the preferred type of turbine may be an axial out-runner turbine comprising an axially arranged series of rotor sections, wherein each rotor section comprises an outer ring and rotor blades and the outer rings of the rotor sections connect to form a rotating outer casing, wherein the rotor sections are made from silicon carbide (for example, sintered silicon carbide, nitride-bonded silicon carbide, recrystallised silicon carbide, silicon-silicon carbide, or reaction bonded silicon carbide).

Alternatively, the preferred type of turbine may be an axial out-runner turbine comprising an axially arranged series of rotor sections, wherein each rotor section comprises an outer ring and rotor blades and the outer rings of the rotor sections connect to form a rotating outer casing, wherein the rotor sections are made from RBSN and the rotor sections are fitted to the inside of an external sheath, the sheath and rotating outer casing being arranged to rotate together, and the sheath is made from silicon carbide or a silicon nitride other than dense silicon nitride (for example, the sheath might be made from gas pressure sintered silicon nitride, sintered silicon nitride, recrystallised silicon nitride, RBSN or sintered RBSN).

Preferably the turbine will be a micro-turbine (i.e. a turbine with a net power output below about 1 MW). In order to function at high temperatures, both conventional in-runner turbines and out-runner turbines using metal components need to be constructed of expensive exotic metal alloys, and either suffer from limited operating temperatures (below about 1,100° C., which limits the power generation efficiency) or else require complex capillary channels to blow cooling working-fluid through the blades to retain their mechanical strength. Cooling channels add substantial complexity to turbine blade design and manufacture, add a parasitic compressor load to power the working-fluid flow, and cannot be easily fit into the very thin and small blades typical in micro-turbines (i.e. gas turbines with net power output below about 1 MW). Therefore preferably, the turbine will be constructed from a suitable ceramic, or a ceramic composite. Preferably the turbine will be constructed from a ceramic material that can deal with higher temperatures and that is able to be machined into complex geometries such as turbine blades, such as reaction bonded silicon nitride (RBSN). Optionally a ceramic turbine, will have a denser ceramic sheath to form a turbine assembly which can take greater mechanical strain than a turbine without a dense sheath Optionally the ceramic material used for the micro-turbine could be silicon carbide or another material suitable for the mechanical strain and temperatures for the successful operation of the turbine. Preferably the micro-turbine will be capable of operating at relatively low rotational speeds (<20,000 rpm as opposed to ~100,000 rpm).

Preferred Type of Combustor: At its simplest, the preferred type of combustor is a flameless combustor as described in GB patent application no. GB1805687.9, which is hereby incorporated within by reference in its entirety and the claims of which describe particular examples of the preferred type of combustor.

The preferred type of combustor, then, may be a flameless combustor system comprising a combustion chamber extending longitudinally through which an oxidising agent flows in the longitudinal direction from an inlet to an outlet and at least one fuel line, wherein at least one fuel injection pipeline in fluid communication with the fuel line extends through a wall of the combustion chamber, wherein each fuel injection pipeline contains at least one fuel injector for injecting fuel into the combustion chamber.

In some examples, the system comprises at least two fuel lines, such that at least one of the at least one fuel injection pipelines extends through the wall of the combustion chamber, across the interior of the combustion chamber to an opposite wall of the combustion chamber, and through the opposite wall, such that the fuel injection pipeline is in fluid communication with both the first and second fuel lines. Where this is the case, it may be that each of the at least one fuel lines comprises a plurality of fuel inlet pipelines extending from it along its length, and each fuel inlet pipeline comprises a plurality of fuel injection pipelines extending from them along their lengths.

In some examples, each of the at least one fuel lines has extending from it at least one fuel inlet pipeline in fluid communication with the fuel line and at least one of the at least one fuel injection pipelines extends from the fuel inlet pipeline, such that the fuel injection pipeline is in fluid communication with the fuel inlet pipeline.

In some examples, the at least one fuel line extends substantially parallel to the combustion chamber in the longitudinal direction. (Where this is the case, it may be that the at least one fuel injection pipelines extend in a direction perpendicular to that of the at least one fuel lines. Where this is the case, it may be that each of the at least one fuel lines has extending from it at least one fuel inlet pipeline in fluid communication with the fuel line and at least one of the at least one fuel injection pipelines extends from at least one of the at least one fuel inlet pipelines, such that the fuel injection pipelines is in fluid communication with the fuel inlet pipelines, and wherein the fuel inlet pipelines extend in a direction perpendicular to that of the at least one fuel lines and of the at least one fuel injection pipelines. Where this is the case, it may be that each of the at least one fuel lines comprises a plurality of fuel inlet pipelines extending from it along its length, and each fuel inlet pipeline comprises a plurality of fuel injection pipelines extending from them along their lengths.)

In some alternatives, the fuel injectors comprise holes or nozzles. Where this is the case, it may be that the holes or nozzles have a size selected to determine the velocity of fuel ejected from the holes or nozzles under operational conditions.

In some alternatives the fuel injectors are oriented towards the outlet of the combustion chamber.

In some alternatives the diameters of the at least one fuel line, at least one fuel injection line, and (where present) at least one the fuel inlet pipelines are chosen such that under operational conditions the pressure of fuel delivered to each injection point is the same.

In some alternatives the fuel injectors are evenly distributed within the combustion chamber Preferably the flameless combustor will be a multi-fuel combustor capable of combusting different fuels with only minor changes to the combustion system. (For example, a combustor with a suitable fuel injection system which enables immediate mixing by injecting fuel at multiple locations in the combustor.)

Preferably the flameless combustor will be designed such that temperatures within the combustor do not reach higher than the typical required thermal $NO_x$ formation temperatures and therefore NO), formation is very low compared to conventional flame combustors. For example, a combustor that injects fuel with enough velocity, co-current with a high velocity oxidising agent flow, to ensure a distributed reaction zone and no flame formation.

Optional Features: Optionally, the fuel will pass through a heat exchanger, well known to those skilled in the art, before injection into the combustor which extracts more energy from the rotary regenerator's low pressure, low temperature output, before exhausting to atmosphere. Due to the large discrepancies of the fuel and exhaust mass flow, the heat exchanger does not have to be a novel design to have a high effectiveness ($\eta_{eff}$). This would help to raise the overall thermal efficiency of the cycle.

Optionally, depending on the fuel source, the fuel will pass through a small fuel compressor before injection into the combustor or fuel heat exchanger.

Optionally the combustor in the gas turbine cycle will be preceded by a typical gas burner for the start-up of the system, suitably sized to provide just the right amount of heat to ensure the input of the flameless combustor is above auto-ignition before turning on the flameless combustor. This burner will be able to deal with high pressure inlet oxidising agent and the burner will be bypassed during normal operation. Optionally the burner will be supplied by an external oxidising agent and an external fuel source rather than the fuel and oxidising agent already used in the process. Optionally, for start-up purposes an auxiliary burner can be used whose exhaust is directed into the rotary regenerator along with the turbine exhaust to enable start up without the requirement of a high pressure burner. Often such a burner will required an induced draft fan on the exhaust side to provide the necessary pressure profile through the rotary regenerator.

Optionally the start-up system will include an electric preheater, for example using a silicon carbide heating element. This will be based on the compressed fluid exit of the rotary regenerator and would increase the temperature of the working fluid before entry into a flameless combustor to ensure the temperature is greater than the auto-ignition before turning on the flameless combustor.

Optionally the start-up combustion system will consist of a cascade system of at least one smaller flameless combustors and at least one small burner such that the burner only needs to be sized to ensure the input temperature of the first and smallest combustor in the cascade system is above the auto-ignition temperature of the fuel, thus reducing the size and complexity of the start-up burner. Optionally this start-up burner could be an electric heater to heat the air.

Optionally the combustor in the gas turbine cycle will be preceded by a vaporiser when using liquid fuels. This would vaporise the liquid fuels and remove the need to fit atomising nozzles to the injection system. Preferably a liquid pump will precede the fuel vaporiser to raise the liquid to the necessary pressure.

Using the rotary regenerator of the present invention ensures high effectiveness ($\eta_{eff}$) for a compact overall footprint (as opposed to a recuperator), preferably the regenerator will be a rotary regenerator which has a geometry that allows a compact design for a high effectiveness ($\eta_{eff}$), for example the present invention.

Preferably the rotary regenerator will have a radial flow relative to the axis of rotation as opposed to a flow path parallel to the axis of rotation in order to further increase the compact design for high effectiveness ($\eta_{eff}$).

Preferably the rotary regenerator will utilise ceramic materials as the thermal media so it can accept a high temperature stream. Preferably the rotary regenerator will be designed such that the sealing faces are metallic as opposed to ceramic such that problems associated with ceramic seals are avoided, for example the present invention.

Preferably the rotary regenerator will be modular such that the size can be easily increased for different flows and process variables.

Optionally the compressed working-fluid to the rotary regenerator could be delivered by a shaft driven compressor. Whilst any compression device will be suitable, a shaft driven compressor will remove the inherent cycle efficiency losses that would result from an electrically driven compressor (i.e. the efficiency lost in generating the electricity and then powering the compressor).

Optionally the shaft driven compressor will be able to produce the required pressure ratio at low rotational speeds.

In the embodiment where the compressors are shaft driven the process will have a self-sustaining speed whereby the rotation speed of the turbine and compressor is sufficient that only fuel is required to keep the turbine rotating. The rotation of the shaft results in a particular pressure ratio of the compressor with a particular mass flow through the compressor based on the resistance of the other components in the system. This mass flow and pressure ratio is sufficient such that, with the addition of fuel in the combustor, the work extracted from the turbine is greater than the work required from the compressor.

Optionally the shaft driven compressor will be a multistage, intercooled compressor such that the compressed air is cooled between stages to reduce the work done by the compressor. In this scenario the compressor will have more than one stages and will be driven via the same shaft. The intercooler may be specific to the compressor or a heat exchanger well known to those skilled in the art.

Optionally the shaft driven compressor and turbine will be connected to a generator such that during start-up the generator can rotate the compressor to provide compressed air into the system before a switchover at a suitable self-sustaining speed is possible. Optionally the shaft driven compressor will be connected to an auxiliary motor for start-up purposes where the shaft from the auxiliary motor can be decoupled from the main turbine shaft during normal operation. Optionally, when shaft compressors are used, start up can be enabled by an auxiliary compressor connected into the system such that, at self-sustaining speed, relevant valve closures can ensure the auxiliary compressors can be turned off and the cycle can run off the shaft compressor.

The cycle described herein is highly efficient (>40%), ultra-low NOx emission (<3 ppm without exhaust gas treatment), low power generation (<1 MW), low cost, modular, has multi-fuel capabilities, scalable (i.e. can be designed at any generation output from 30 kW to 1 MW), low complexity and therefore simple for control, and has the potential to be compact (for example for use in the automotive industry).

FIGS. 12-27 depict abstract schematic for systems incorporating the rotary regenerator as part of a Brayton-type turbine cycle or other turbine cycle. In each case the system is adapted for a core process involving a compressor to deliver compressed air to three core components, a rotary regenerator, a turbine, and a combustor.

Figure 12:
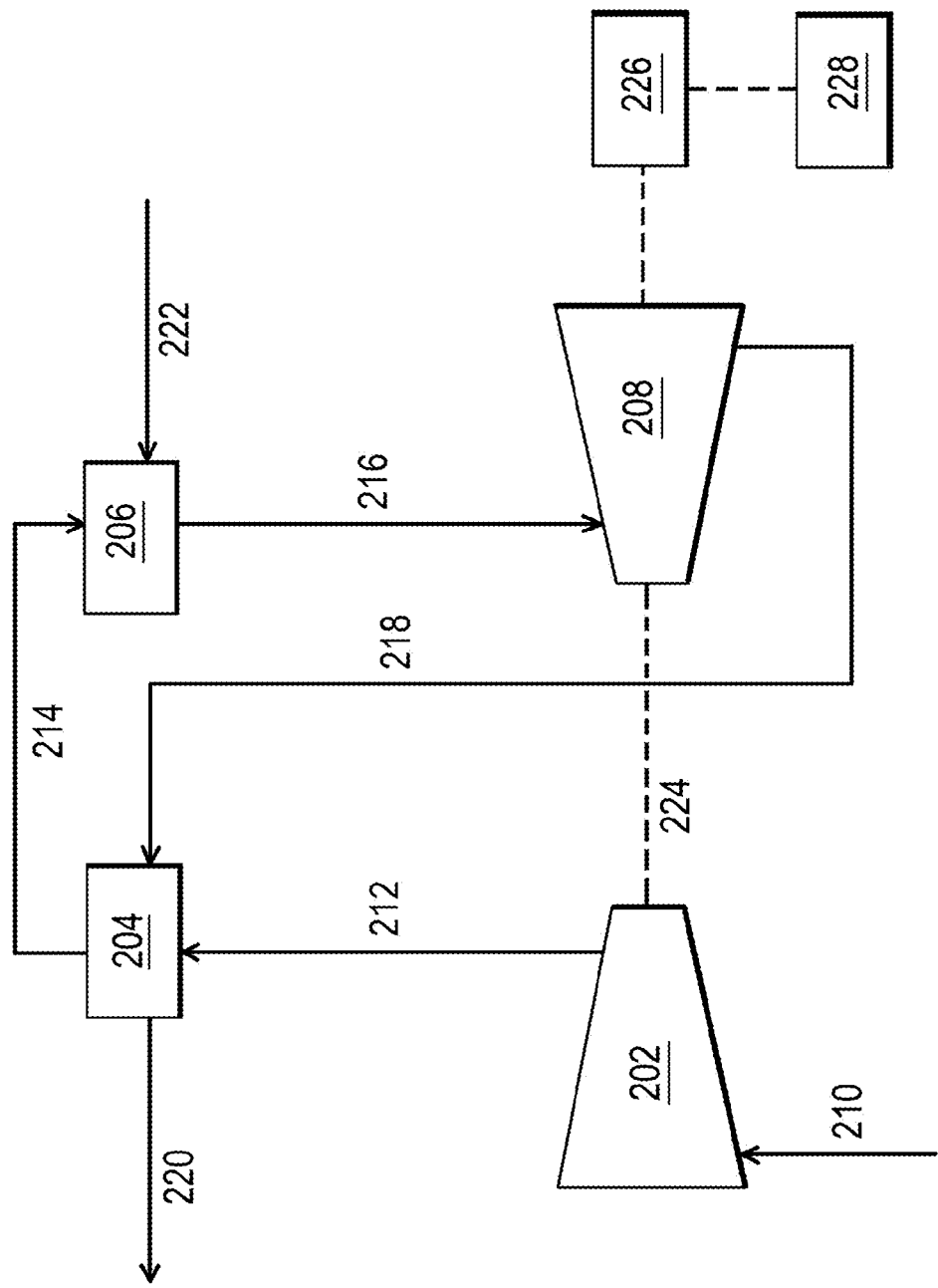
FIG. 12: A system undergoing a process in which a rotary recuperator according to the present invention is incorporated into a turbine cycle.

FIG. 12 depicts a system adapted to implement a process whereby cool low-pressure working fluid, in the present invention ambient air 210, is drawn into a compression stage 202. Compressed air 212, typically above ambient temperature, but below approximately 150° C. exits the compression stage and enters the high temperature rotary regenerator 204, the compressed air is heated in the regenerator by the turbine exhaust stream 218, before exiting as a high temperature, high pressure stream 214. This stream, 214, must be above the auto-ignition temperature of the fuel 222. The high temperature, high pressure air, 214, is used as an oxidising agent in the ultra-low $NO_x$ (<3 ppm) flameless combustor 206. Fuel, 222 is combusted and therefore raises the temperature of the of the combustion air, 216, to the necessary turbine inlet temperature, approx 1250° C. The expander, 208, a fully ceramic micro-turbine turbine (<1 MW) extracts work from the stream, which can be converted into electrical power via a gearbox, 226, and a generator/motor, 228. In the case where a high speed generator 228 can be used, a gearbox 226 is not required. The turbine also drives the compressor, 202 through the shaft, 224. The turbine exhaust, 218, provides the high temperature to the rotary regenerator 204, which transfers heat to stream 212 and exhausts to atmosphere as stream 220. Optionally, the amount of fuel, 222, input into the system could be decreased by providing another source of thermal input. The input could be a direct input (i.e. injection of hot fluid), or indirect (i.e. via heat exchange). The location of input depends on type and method of input and could be post compression and before regeneration, 212, after regeneration, 214 or into the turbine exhaust, 218. This includes, but is not limited to, solar thermal energy, waste heat energy (e.g. steam, thermal oil or exhaust from another process), electrical energy or energy from an exothermic reaction that is not combustion.

Figure 13:
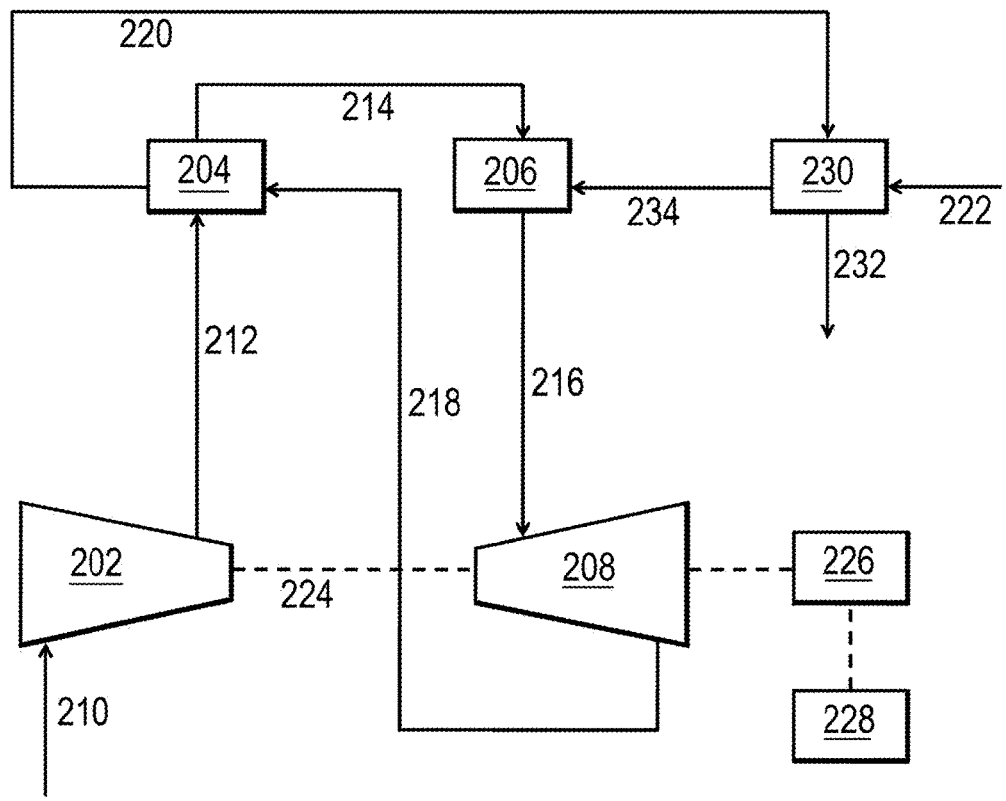
FIG. 13: As FIG. 12 but also including an optional fuel heat exchanger from heat recovery exhaust.

FIG. 13 depicts a system adapted to implement the process as described in FIG. 12 whereby the exhaust stream 220 is redirected via a heat exchanger 230 that pre-heats the fuel 222 using the heat from the exhaust stream 220. The lower temperature exhaust 232 is exhausted to atmosphere and the fuel, raised in temperature, 234, enters the combustor. This would typically be wasted and therefore helps to increase the overall thermal efficiency of the process.

Figure 14:
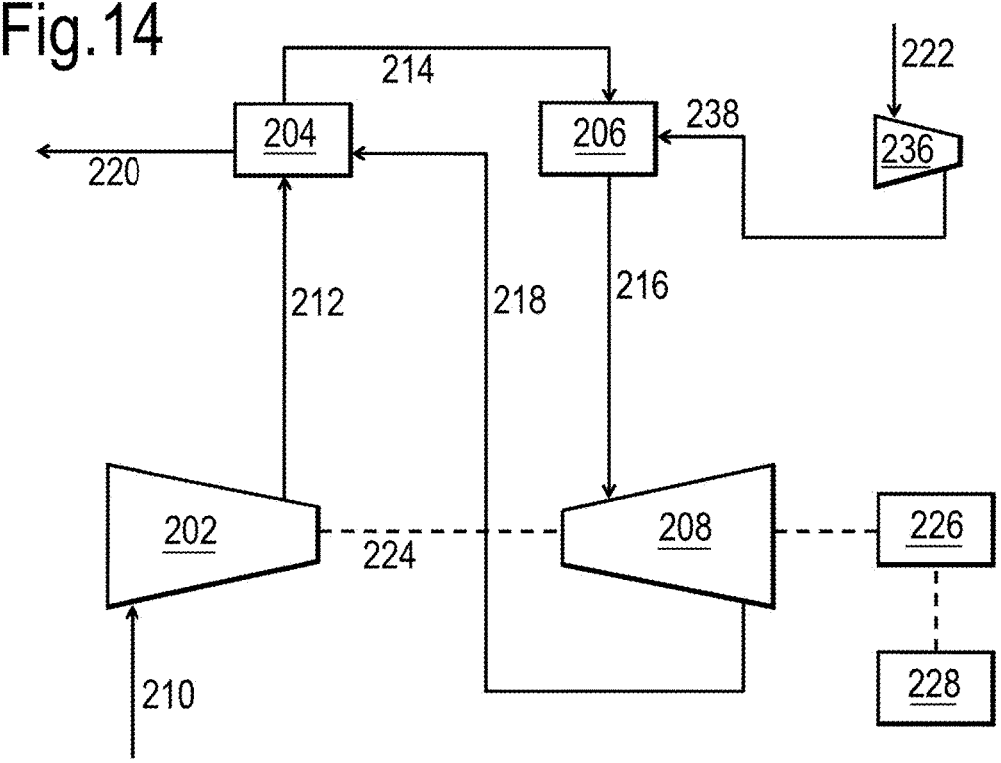
FIG. 14: As FIG. 12 but including an optional fuel compressor.

FIG. 14 depicts a system adapted to implement the process as described in FIG. 12 whereby the fuel 222 enters an optional fuel compressor 236, in order to raise the pressure of the fuel 238 before injection should this be required.

Figure 15:
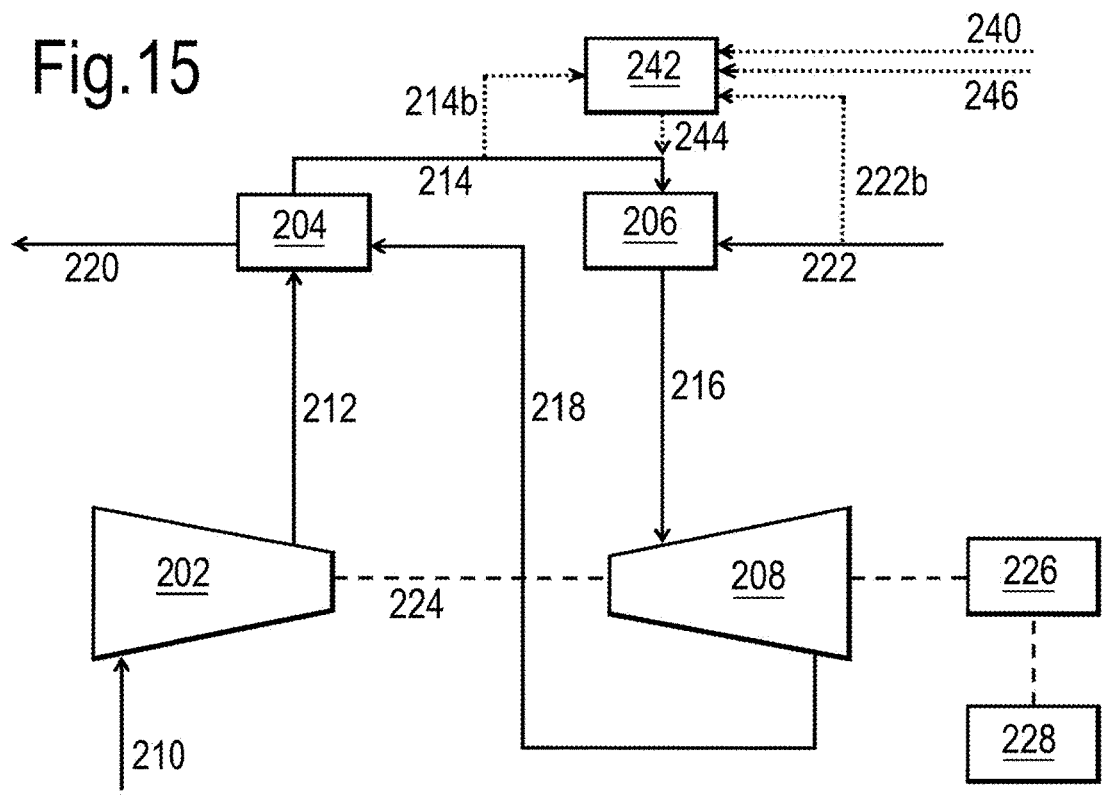
FIG. 15: As FIG. 12 but including an optional high pressure burner for start-up purposes

FIG. 15 depicts a system adapted to implement the process as described in FIG. 12 but includes an optional fuel burner 242 for start-up purposes. In some embodiments, notably when the combustor 206 is a flameless combustor, the combustor 206 requires a high temperature air input 214 to ensure auto ignition of the fuel 222. In this embodiment is necessary to raise the temperature of the stream 214 during start up, before the rotary regenerator 204 is able to draw enough heat from the expander exhaust 218. One method of doing this is to use a high pressure burner 242. The fuel burner 242 could use an external fuel line 240, a redirect of the original fuel line, 222b or both. The fuel burner would also utilise an external oxidising agent 246 or a redirect of the high pressure, high temperature compressed air 214b depending on application. Such a fuel burner would be capable of dealing with high pressures and in the case of using the compressed air 214b as an oxidising agent, high temperature inlet oxidising agent. During start-up high temperature combustion air 244 can be injected into the compressed air stream 214 or directly into the combustor 206. Preferably, the burner would be turned off during normal operation.

Figure 16:
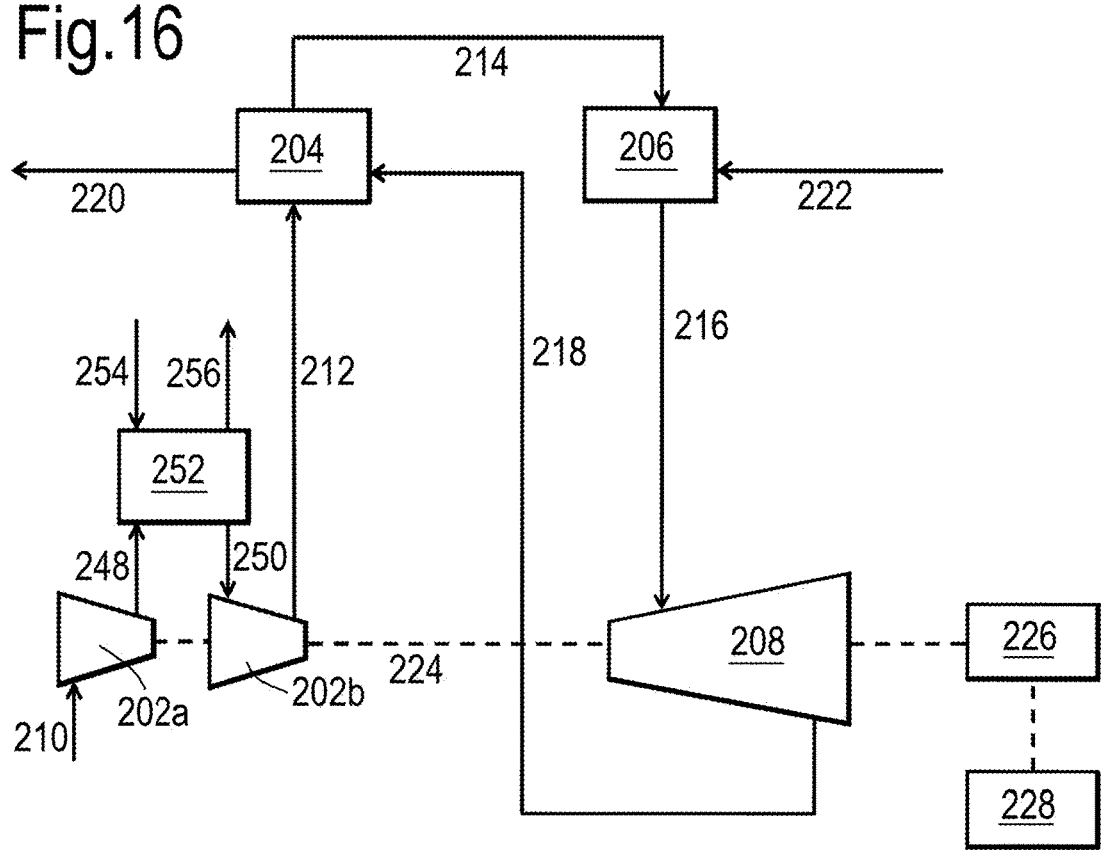
FIG. 16: As FIG. 12 but replacing the compressor with a multistage intercooled shaft driven compressor.

FIG. 16 depicts a system adapted to implement the process as described in FIG. 12 whereby the shaft driven compressor has been replaced by a multistage, intercooled shaft driven compressor 202a, 202b to reduce the work done by the compression stage. FIG. 16 depicts a two stage compressor, a low pressure stage 202a and a high pressure stage 202b whereby both compressors are shaft driven. Cold ambient air 210 is drawn into the first stage compressor 202a and compresses this stream to a specified pressure. For a two stage compression system this is nominally the square root of the final pressure ratio (pressure of compressed air 212 over pressure of ambient air 210). The semi-compressed air 248 enters a heat exchanger 252 which extracts heat through a cooling fluid 254 and the semi compressed air, now at a lower temperature 250 enters the second compressor stage 202b. The cooling fluid 254 exits the heat exchanger at a higher temperature 256. The second stage compressor 202b compresses the semi compressed air 250 to the desired working fluid pressure 212. Optionally this multistage compressor could be driven by an external shaft or motor, be multi-spooled and could involve more than two stages.

Figure 17:
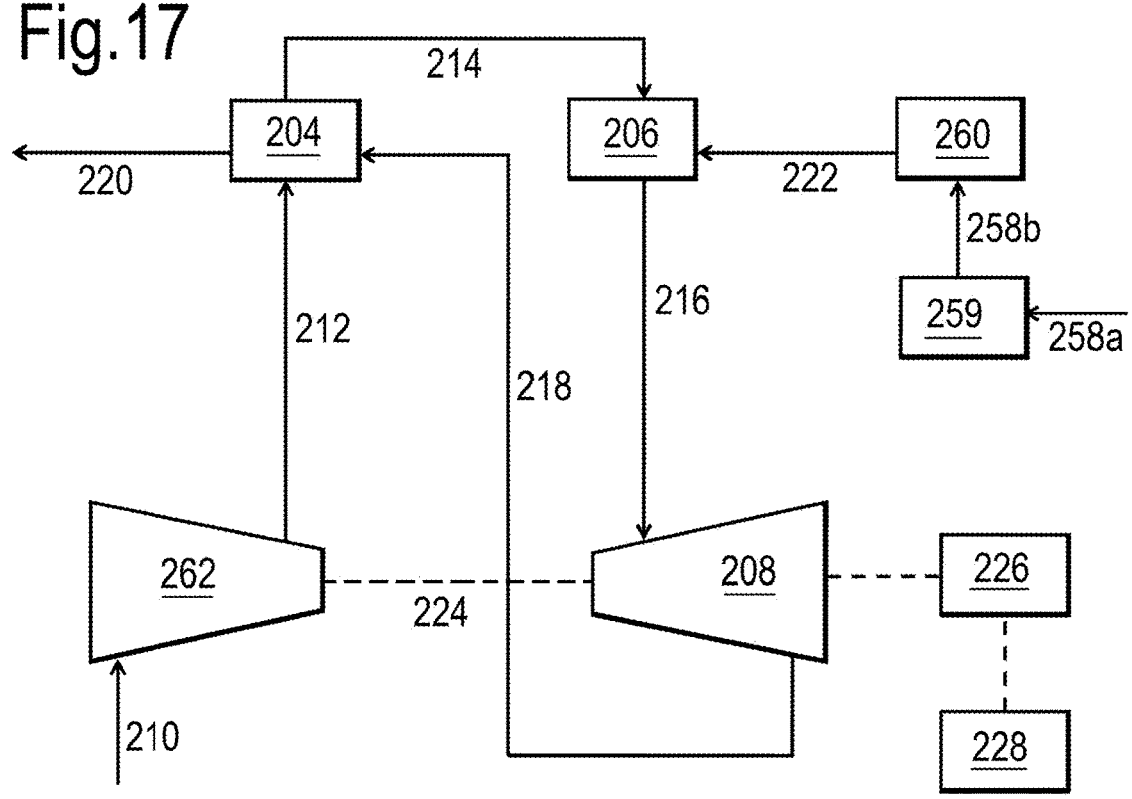
FIG. 17: As FIG. 12 but including an optional fuel vaporiser for use with liquid fuels.

FIG. 17 depicts a system adapted to implement the process as described in FIG. 12 including an optional fuel vaporiser 260 that turns a liquid fuel 258b into a gaseous fuel 258c before injection into the combustor. The liquid fuel 258a would be raised in pressure via a pump or liquid compressor 259. This would be used should the process require use with a liquid fuel without modifying the multi-fuel combustor 206 for use with a liquid fuel.

Figure 18:
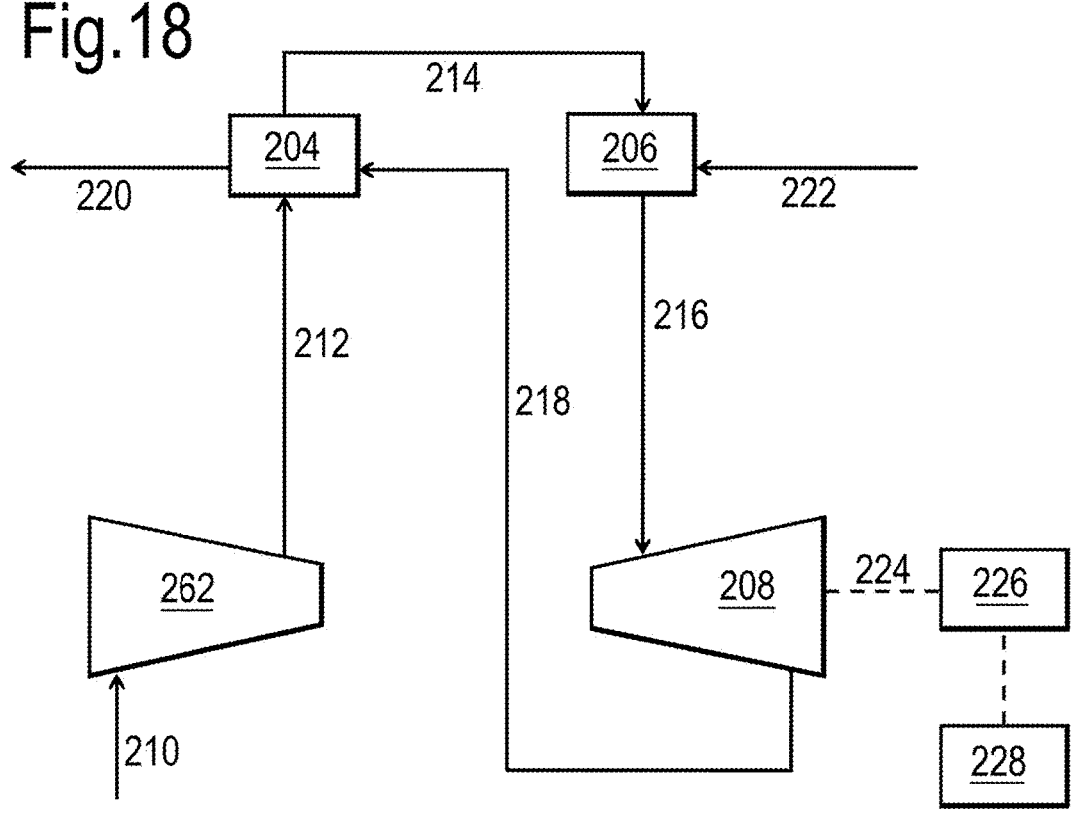
FIG. 18: As FIG. 12 but replacing the compressor with a non-shaft driven compressor.

FIG. 18 depicts a system adapted to implement the process as described in FIG. 12 but for use with a compressor that is not shaft driven 262. Typically a compressor like this will be electrically driven or via a diesel generator. This would allow all of the turbine work to be utilised for electrical generation via the generator 228.

FIG. 19 depicts a system adapted to implement the process as described in FIG. 12 including an optional auxiliary motor 264 and shaft 266 used for rotating the compressor 202 for start-up purposes only. The start-up shaft 266 could be decoupled from the main shaft 224 during normal operation. The motor 264 may contain its own generator or be attached to the mains electricity. This allows a decoupling of the compressor 202 and the turbine 208 during start up.

FIG. 20 depicts a system adapted to implement the process as described in FIG. 12 but with an electrical air pre-heater 268 to heat the high pressure air 214c during start-up. This would raise the temperature of the compressed air 214 through an external electrical input, for example using a silicon carbide heating element embedded in the fluid ducting such that the temperature of the heater exit 270 is a high enough temperature for start-up purposes. The electrical air preheater 268 could preheat a redirect of the high pressure, high temperature compressed air 214c or sit within the ducting of the main flow, 214. This provides a simple method to raise the temperature of the compressed air 214 to above the required auto-ignition temperature for use with a flameless combustor.

Figure 21:
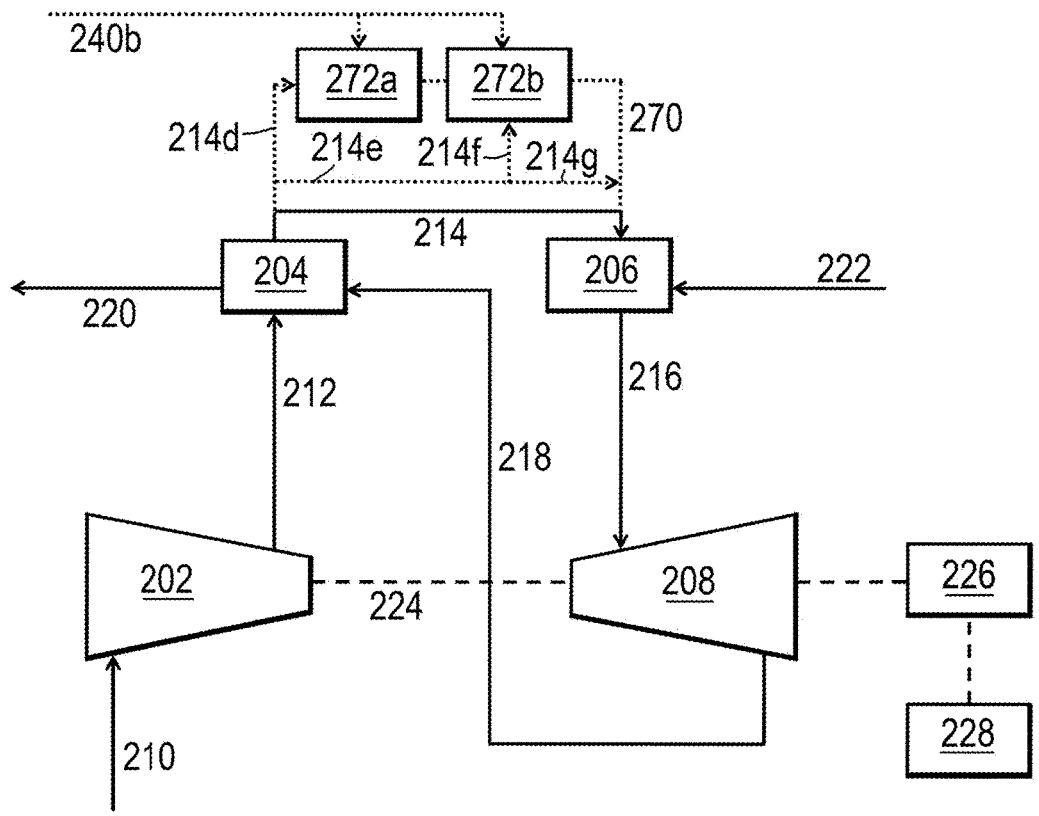
FIG. 21: As FIG. 12 but including an optional cascade burner system for start-up purposes.

FIG. 21 depicts a system designed to implement the process as described in FIG. 12 with at least one cascade start-up burner 272a and optionally a cascade flameless combustor 272b. In one embodiment, during start-up the compressed air stream 214 is split into a larger and smaller fluid flow, 214e and 214d respectively. The smaller fluid flow 214c enters a combustor or burner 272a whereby fuel 240b is combusted and thus the temperature of this fluid is raised (270) and mixed with the larger fluid flow 214e before entering the main combustor 206. This results in a further increase in temperature of the compressed air 214 through heat recovery in the rotary regenerator 204. The fluid temperature is partially raised until the portion of the fluid 214d is raised sufficiently such that flameless combustion can occur in a secondary start-up combustor 272b. Preferably the secondary start-up combustor would also have another input fluid 214f such that the overall mass flow of the raised temperature combustion air 270 is larger than when used without the secondary combustor. Such a cascade system would continue until the temperature of the combusted fluid 270 mixed with the working fluid 214g is sufficiently high, i.e. above the necessary auto-ignition temperature, such that flameless combustion can occur in the main combustor 206. Optionally the system would be bypassed during normal operation, 214. In such a system the number and size of cascade burners and flameless combustors 272a and 272b is application dependent as is the partitioning of the flows, 214d, 214e, 214f, 214g.

Figure 22:
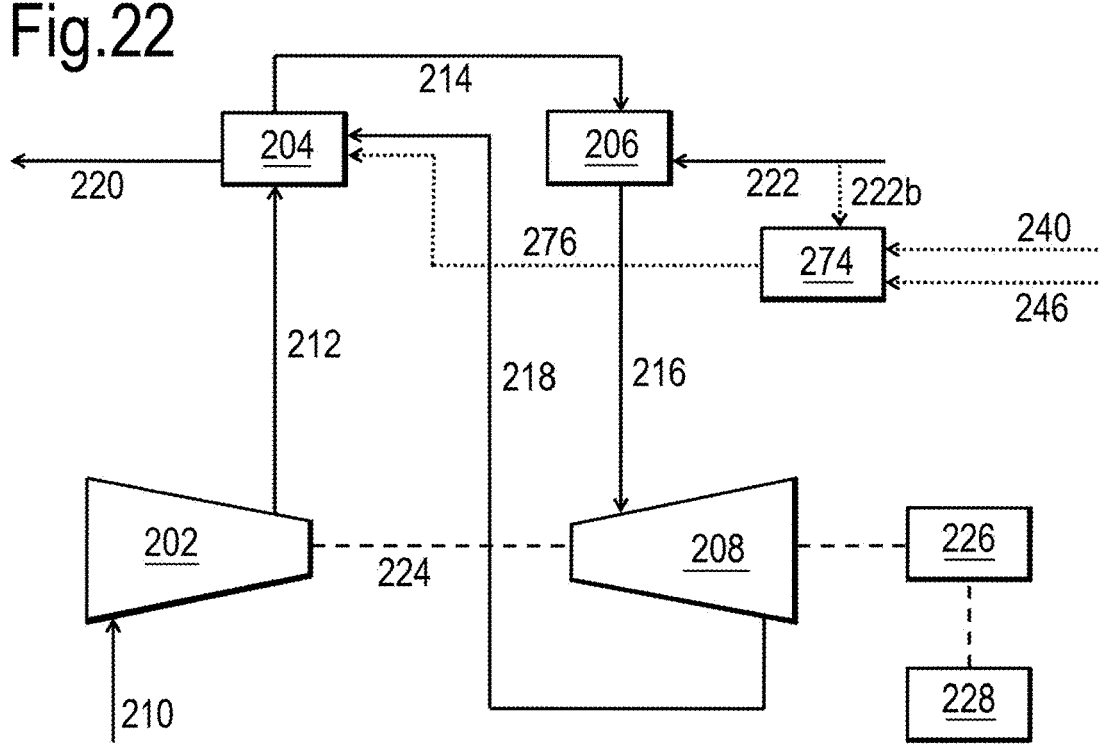
FIG. 22: As FIG. 12 but including an optional auxiliary burner for start-up purposes.

FIG. 22 depicts a system adapted to implement the process as described in FIG. 12 with an optional auxiliary burner 274 for start-up purposes. The auxiliary burner 214 combusts a fuel source 240, or uses the existing fuel source redirected 222b, with an external oxidising agent 246, preferably at ambient pressure. The auxiliary burner exhaust 276 enters the rotary regenerator and provides the necessary heat for heat exchange to increase the temperature of the compressed air 214 before entering the combustor 206. This can occur until the mass flow and temperature of turbine exhaust 218 is sufficient to provide the necessary heat to the compressed air 214. This provides a simple method to raise the temperature of the compressed air 214 to above the required auto-ignition temperature for use with a flameless combustor. Such a system may require an induced draft fan placed on the process exhaust, 220.

Figure 23:
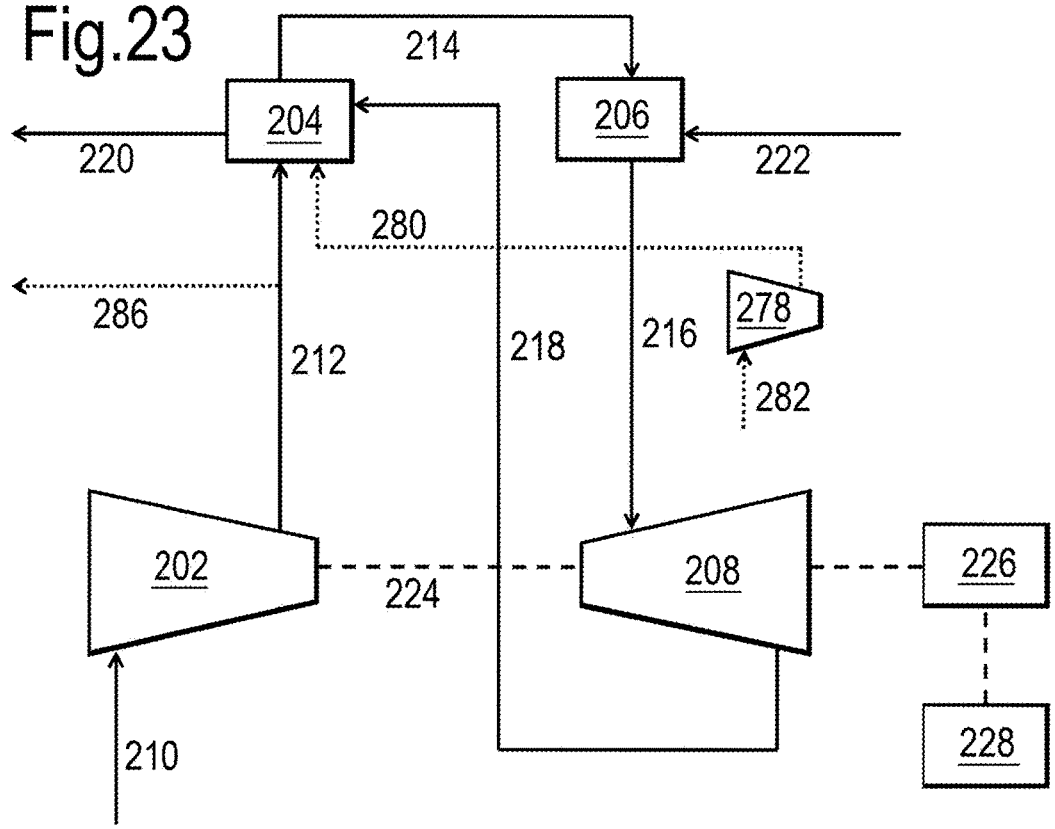
FIG. 23: As FIG. 12 but including an optional auxiliary compressor for start-up purposes.

FIG. 23 depicts a system adapted to implement the process as described in FIG. 12 with an auxiliary compressor for start-up purposes during use of a shaft driven compressor 202. In some embodiments the generator will not be suitable to start up the compression process when using a shaft driven compressor 202. In these embodiments it will be necessary to provide pressurisation from an auxiliary compressor 278. During start-up the auxiliary compressor 278 compresses a cool working fluid 282 to a high pressure fluid 280. This fluid is then raised in temperature by the rotary regenerator 204. The auxiliary compressor will continue to be utilised until the shaft driven compressor 202 is rotating fast enough to provide the necessary mass flow of compressed fluid 212 such that the process is at a self-sustaining rotation speed. Optionally, the outlet of the shaft compressors can be vented to atmosphere, 286, until a switchover of compressors occurs.

Figure 24:
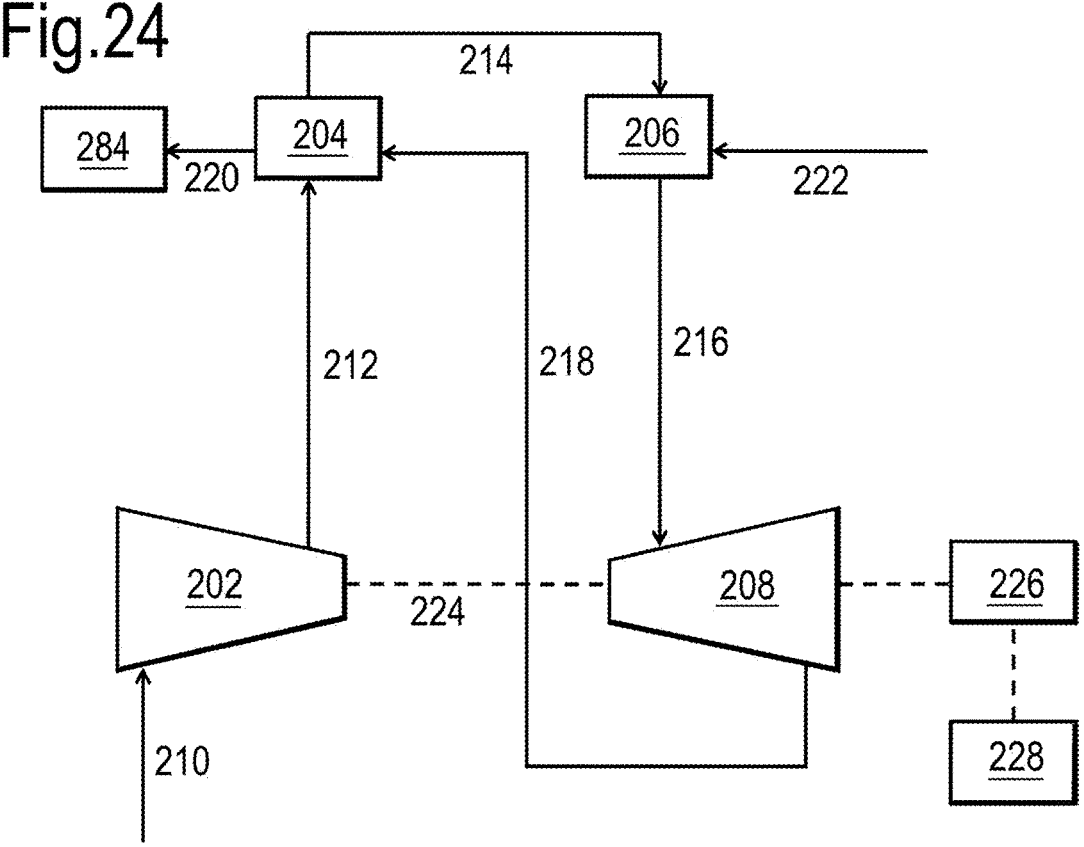
FIG. 24: As FIG. 12 but including an optional exhaust heat exchanger for further heat recovery.

FIG. 24 depicts a system adapted to implement the process as described in FIG. 12 with the addition of an optional exhaust heat recovery device 284. This device may be a heat exchanger for a district heating system, or a refrigeration system or other equipment that extracts energy from the exhaust stream.

Figure 25:
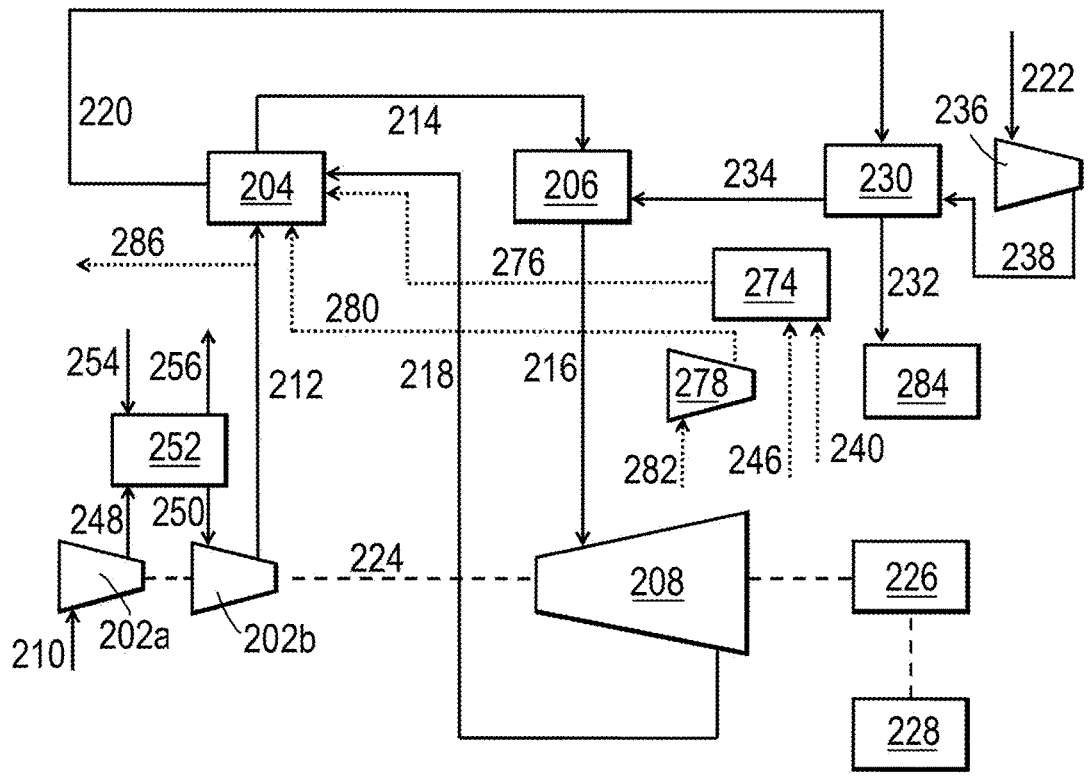
FIG. 25: A general system incorporating numerous additions to the system of FIG. 12, based on an example of a potential static electricity generation process.

FIG. 25 depicts a system designed to implement the process as described in FIG. 12 whereby the core process is adapted for one embodiment of static electricity generation. This includes a multistage shaft driven compressor 202a, 202b with inter stage cooling 252. The fuel 222 is compressed via fuel compressor 236 before being heated via a fuel heat exchanger 230 using the process exhaust 220 which is then directed to a heat exchanger 284 for use in an application such as district heating. An auxiliary compressor 278 and auxiliary burner 274 are used for start-up purposes. This is only one embodiment for a static electricity generation application, other embodiments of the various auxiliary systems and core process exist for the same application.

Figure 26:
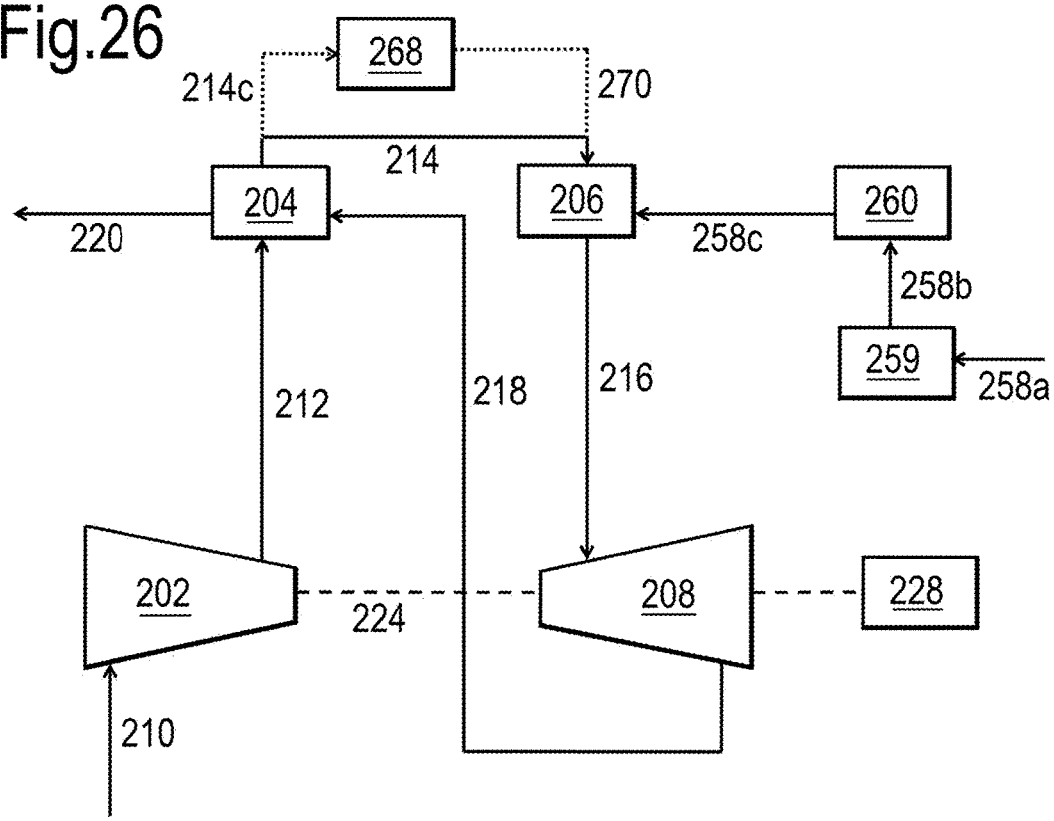
FIG. 26: A general system incorporating numerous additions to the system of FIG. 12, based on an example of a potential automotive range extender application.

FIG. 26 depicts a system designed to implement the process as described in FIG. 12 whereby the core process is adapted for one embodiment of automotive range extension. This includes an electric heater 268 to heat the compressed air 214c during start up such that the heated compressed air 270 is a high enough temperature for starting the flameless multi fuel combustor 206. Liquid fuel 258a is pumped via a liquid pump 259 to a vaporiser 260 which vaporises the pressurised liquid 258b for injection into the combustor 206 as a gaseous fuel 258b. In this embodiment a high speed generator 228 is used to convert the turbine work into potential energy and thus a gearbox is not necessary. Additionally the generator 228 would be used to drive the shaft for start-up purposes. This is only one embodiment for an automotive range extension application, other embodiments of the various auxiliary systems and core process exist for the same application.

FIG. 27 depicts a start-up procedure for the system depicted in FIG. 25. Initially, the start-up auxiliary compressor, 278 to provide compressed air to the system. Then the start-up auxiliary burner, 274 to enable the rotary regenerator, 204 to heat stream 214. The turbine, 208, and shaft compressors, 202a,202b will start to spin. As the shaft compressors, 202a, 202b spin faster the mass flow through them increases and compressed air from shaft compressors is vented to atmosphere. Compressed air stream 214 will increase in temperature as the rotary regenerator heats up. When flameless combustor inlet, 214, is high enough for flameless combustion of fuel, 234, the auxiliary burner, 274 is turned off and the flameless combustor, 206 turned on. More fuel input results in a larger energy input into the system and a higher temperature into the turbine, as such as fuel input increases into the system the speed of the turbine, and thus the shaft will increase. The fuel input, 222, is increased until rotational speed of shaft, 224, is high enough such that the mass flow through the compressors, 202a, 202b will be sufficient for the system to self-sustain without additional compressed air input from auxiliary compressor, 278. At this point compressed air from shaft compressors, 202a, 202b directed to rotary regenerator, 204 and auxiliary compressor, 278 turned off, this could be achieved by a three way valve for example. Fuel input, 222, and load from generator, 228, manipulated until speed of shaft, 224, reaches design point.

Applications of Regenerators and Turbine Cycles Incorporating them

Regenerators and turbine cycles incorporating them can be utilised in a range of different applications, particularly those where their particular advantages are especially desirable. Automobiles, for instance, could incorporate such regenerators and/or turbine cycles; such turbine cycles could also be used for static generation of electricity.

The invention claimed is:

1. A regenerative heat exchanger module comprising:
   a) a chamber;
   b) at least one first inlet and at least one first outlet to the chamber, for passage of part at least of a first fluid stream;
   c) at least one second inlet and at least one second outlet to the chamber, for passage of part at least of a second fluid stream;
   d) at least one rotatable body within the chamber mounted for rotation about an axis;

characterised in that the at least one body comprises a plurality of fluid flow passages extending transversely of the axis of rotation and separated by a fluid permeable heat transfer medium, the plurality of fluid flow passages being arranged such that in use i. in a first rotational position the plurality of fluid flow passages are aligned with the at least one first inlet and at least one first outlet, such that the part at least of the first fluid stream passes through the at least one first inlet into at least one of the fluid flow passages, through the fluid permeable heat transfer medium into at least one adjacent fluid flow passage, and through the at least one adjacent fluid flow passage into the at least one first outlet, and ii. in a second rotational position the plurality of fluid flow passages are aligned with the at least one second inlet and the at least one second outlet, such that the part at least of the second fluid stream passes through the at least one second inlet into at least one of the fluid flow passages, through the fluid permeable heat transfer medium into at least one adjacent fluid flow passage, and through at least one adjacent fluid flow passage into the at least one second outlet.

2. A regenerative heat exchanger module as claimed in claim 1, wherein the at least one first inlet and at least one first outlet are circumferentially opposite one another, and the at least one second inlet and at least one second outlet are circumferentially opposite one another.

3. A regenerative heat exchange module as claimed in claim 1, wherein the at least one of the fluid flow passages that the part at least of the first fluid stream passes into from the at least one first outlet in the first rotational position is also the at least adjacent flow passage from which the part at least of the second fluid stream passes into the second outlet in the second rotational position, and wherein the at least one adjacent flow passage from which the part at least of the first fluid stream flows into the at least one first outlet in the first rotational position is also the at least one of the fluid flow passages into which the part at least of the second fluid stream flows into in the second rotational position.

4. A regenerative heat exchanger module comprising a chamber as claimed in claim 1, wherein the rotatable body is housed in a rotor drum and the rotor drum is housed within a pressure vessel, such that the rotor drum is adapted to rotate with the rotatable body and the pressure vessel remains stationary.

5. A regenerative heat exchanger module as claimed in claim 4, further comprising external penetrations in the pressure vessel and the rotor drum which align in the first rotational position to seal with the first inlet and the first outlet, and in a second rotational position to seal with the second inlet and the second outlet, and wherein the penetrations in the pressure vessel and in the rotor drum also align with at least one of the plurality of fluid flow passages in the fluid permeable heat transfer medium.

6. A regenerative heat exchanger module as claimed in claim 4 comprising a circular sliding interface between the stationary pressure vessel and the rotor drum enabling a seal tight engagement to block passage of a second fluid stream in a first rotational position, and to block passage of a first fluid stream in a second rotational position.

7. A regenerative heat exchanger module as claimed in claim 1 wherein the fluid permeable heat transfer medium is arranged in a honeycomb matrix structure, or mesh, or as honeycomb blocks stacked together.

8. A regenerative heat exchanger module as claimed in claim 1, wherein the at least one first inlet, at least one first outlet, at least one second inlet, at least one second outlet, the fluid permeable heat transfer medium and the plurality of fluid flow passages are coplanar with respect to a plane perpendicular to the axis of rotation.

9. A regenerative heat exchanger module as claimed in claim 1, wherein
   i) the at least one first inlet and at least one first outlet are not coplanar with one another with respect to a plane perpendicular to the axis of rotation;
   ii) the at least one second inlet and at least one second outlet are not coplanar with one another with respect to a plane perpendicular to the axis of rotation;
   iii) the plurality of fluid flow passages are distributed along the axis of rotation such that at least one fluid flow passage is coplanar with respect to a plane perpendicular to the axis of rotation with each of the at least one first inlet, the at least one first outlet, the at least one second inlet, and the at least one second outlet;
   iv) the fluid permeable heat transfer medium is distributed along the axis of rotation, such that in a first rotational position the part at least of the first fluid stream passes from a fluid flow passage coplanar with respect to a plane perpendicular to the axis of rotation with the at least one first inlet through the fluid permeable heat transfer medium into at least one adjacent fluid flow passage coplanar with respect to a plane perpendicular to the axis of rotation with the at least one first outlet, and in a second rotational position the part at least of the second fluid stream passes from a fluid flow passage coplanar with respect to a plane perpendicular to the axis of rotation with the at least one second inlet through the fluid permeable heat transfer medium into at least one adjacent fluid flow passage coplanar with respect to a plane perpendicular to the axis of rotation with the at least one second outlet.

10. A regenerative heat exchanger as claimed in claim 9, wherein the at least one first inlet is coplanar with respect to a plane perpendicular to the axis of rotation with the at least one second outlet, and the at least one second inlet is coplanar with respect to a plane perpendicular to the axis of rotation with the at least one first outlet.

11. A regenerative heat exchanger as claimed in claim 1, wherein the first fluid stream has a higher pressure than the second fluid stream, and wherein the second fluid stream enters the heat exchanger at a higher temperature than the first fluid stream, and wherein the first fluid stream exits the heat exchanger at a higher temperature than when it entered and the second fluid stream exits the heat exchanger at a lower temperature than when it entered.

12. An assembly of at least two regenerative heat exchangers as claimed in claim 1, coupled to allow passage of the first and second fluid streams between heat exchangers.

13. A system for putting into effect a turbine cycle, comprising a turbine, a combustor, and at least one regenerative heat exchanger as claimed in claim 1.

14. A system as claimed in claim 13, wherein the turbine is an out-runner turbine primarily comprising ceramic material.

15. A system as claimed in claim 13, wherein the combustor is a flameless combustor system comprising:
   a combustion chamber extending longitudinally through which an oxidising agent flows in the longitudinal direction from an inlet to an outlet, and
   at least one fuel line;
   wherein at least one fuel injection pipeline in fluid communication with the fuel line extends through a wall of the combustion chamber, wherein each fuel injection pipeline contains at least one fuel injector for injecting fuel into the combustion chamber.

16. An automobile or engine for an automobile comprising at least one regenerative heat exchanger as claimed in claim 1.

17. A static generator comprising at least one regenerative heat exchanger as claimed in claim 1.

* * * * *

UNITED STATES PATENT AND TRADEMARK OFFICE
CERTIFICATE OF CORRECTION

PATENT NO. : 11,231,236 B2
APPLICATION NO. : 17/057445
DATED : January 25, 2022
INVENTOR(S) : Tristram Bracey It is certified that error appears in the above-identified patent and that said Letters Patent is hereby corrected as shown below:

On the Title Page

Foreign Application Priority Data:
Item (30) Line 1: Replace "1808662" with --1808662.9--.

Signed and Sealed this
Twenty-eighth Day of June, 2022

Katherine Kelly Vidal
*Director of the United States Patent and Trademark Office*